US012010679B2

(12) United States Patent
Yang et al.

(10) Patent No.: US 12,010,679 B2
(45) Date of Patent: Jun. 11, 2024

(54) METHOD FOR TRANSMITTING AND RECEIVING SIGNAL IN WIRELESS COMMUNICATION SYSTEM FOR SUPPORTING UNLICENSED BAND, AND DEVICE FOR SUPPORTING SAME

(71) Applicant: LG Electronics Inc., Seoul (KR)

(72) Inventors: Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 617 days.

(21) Appl. No.: 17/267,440

(22) PCT Filed: Aug. 9, 2019

(86) PCT No.: PCT/KR2019/010073
§ 371 (c)(1),
(2) Date: Feb. 9, 2021

(87) PCT Pub. No.: WO2020/032683
PCT Pub. Date: Feb. 13, 2020

(65) Prior Publication Data
US 2021/0314984 A1 Oct. 7, 2021

Related U.S. Application Data

(60) Provisional application No. 62/716,920, filed on Aug. 9, 2018.

(51) Int. Cl.
*H04W 72/04* (2023.01)
*H04L 5/00* (2006.01)
(Continued)

(52) U.S. Cl.
CPC ....... *H04W 72/1268* (2013.01); *H04L 5/0044* (2013.01); *H04L 5/0053* (2013.01);
(Continued)

(58) Field of Classification Search
CPC ..... H04L 5/0007; H04L 5/001; H04L 5/0044; H04L 5/0048; H04L 5/0051;
(Continued)

(56) References Cited

U.S. PATENT DOCUMENTS 10,820,269 B2 * 10/2020 Lu .................. H04W 52/0216
10,904,909 B2 * 1/2021 Cao ...................... H04L 5/0007
(Continued)

FOREIGN PATENT DOCUMENTS

JP       2018038045      3/2018
WO      WO2017026543    2/2017
(Continued)

OTHER PUBLICATIONS

3GPP TS 38.213 V15.1.0, 3rd Generation Partnership Project; Technical Specification Group Radio Access Network; NR; Physical layer procedures for control (Release 15), 77 pages, Mar. 2018.*
(Continued)

*Primary Examiner* — Frank Duong
(74) *Attorney, Agent, or Firm* — Fish & Richardson P.C.

(57) ABSTRACT

The present invention relates to a wireless communication system and, particularly, to a method and a device therefor, the method comprising the steps of: receiving demodulation reference signal (DMRS) configuration information; receiving scheduling information about a plurality of transmission time intervals (TTIs); and transmitting data on the basis of the DMRS configuration information in a plurality of continuous TTIs, wherein first DMRS configuration information of the DMRS configuration information is applied to a first group from among the plurality of continuous TTIs, and second DMRS configuration information of the DMRS configuration information is applied to a second group from among the plurality of continuous TTIs.

11 Claims, 21 Drawing Sheets

(51) Int. Cl.
*H04W 72/0446* (2023.01)
*H04W 72/1268* (2023.01)

(52) U.S. Cl.
CPC ....... *H04L 5/0082* (2013.01); *H04W 72/0446* (2013.01); *H04L 5/0007* (2013.01)

(58) Field of Classification Search
CPC ... H04L 5/0053; H04L 5/0055; H04L 5/0078; H04L 5/0082; H04L 5/0094; H04W 72/0446; H04W 72/1268; H04W 72/23; H04W 72/542
See application file for complete search history.

(56) References Cited

U.S. PATENT DOCUMENTS

| | | | | |
|---|---|---|---|---|
| 11,570,802 | B2* | 1/2023 | Yang | H04W 72/1268 |
| 11,606,177 | B2* | 3/2023 | Ma | H04W 72/23 |
| 11,683,813 | B2* | 6/2023 | Choi | H04L 1/1854 370/329 |
| 2016/0270059 | A1 | 9/2016 | Chen et al. | |
| 2017/0289869 | A1* | 10/2017 | Nogami | H04L 5/0094 |
| 2019/0230689 | A1* | 7/2019 | Cao | H04L 27/2602 |
| 2019/0363824 | A1* | 11/2019 | Sun | H04L 5/0091 |
| 2021/0314983 | A1* | 10/2021 | Karaki | H04W 72/0446 |

FOREIGN PATENT DOCUMENTS

| | | |
|---|---|---|
| WO | WO2017132841 | 8/2017 |
| WO | WO2018089140 | 5/2018 |

OTHER PUBLICATIONS

3GPP TS 38.214 V15.2.0, 3rd Generation Partnership Project; Technical Specification Group Radio Access Network; NR; Physical layer procedures for data (Release 15), 98 pages, Jun. 2018.*
PCT International Search Report and Written Opinion in International Appln. No. PCT/KR2019/010073, dated Nov. 27, 2019, 21 pages (with English translation).

* cited by examiner

FIG. 7
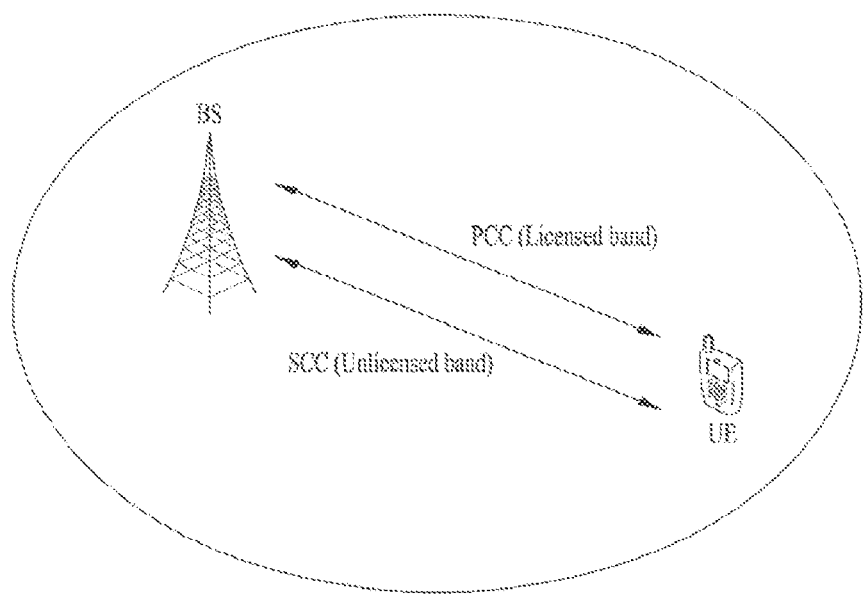
(a) Carrier aggregation between L-band and U-band
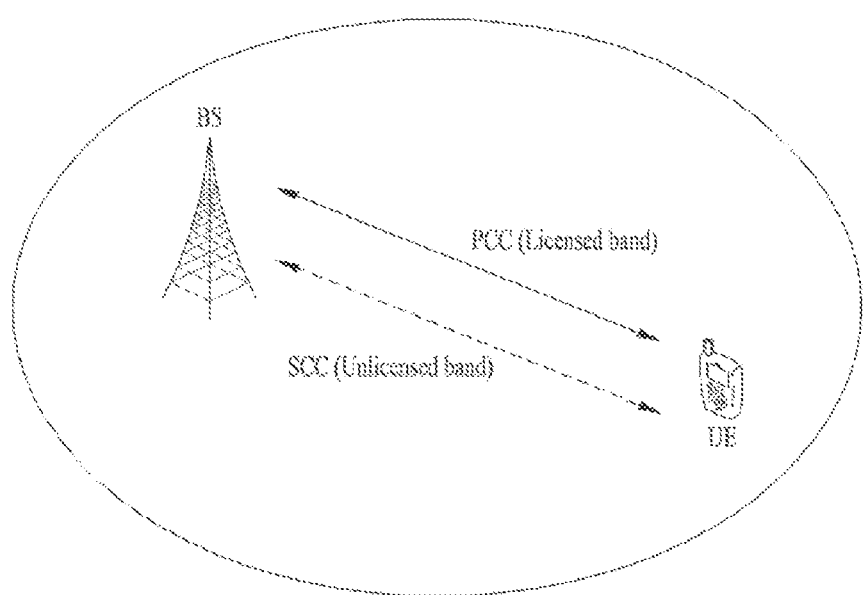
(b) Standalone U-band(s)

FIG. 12
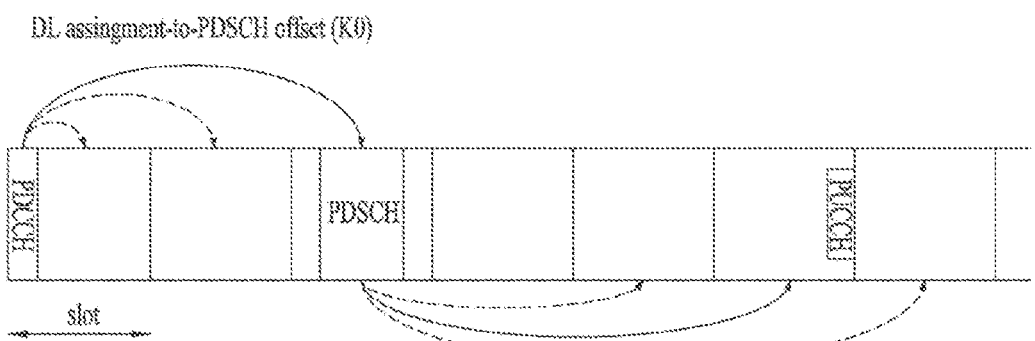
(a)
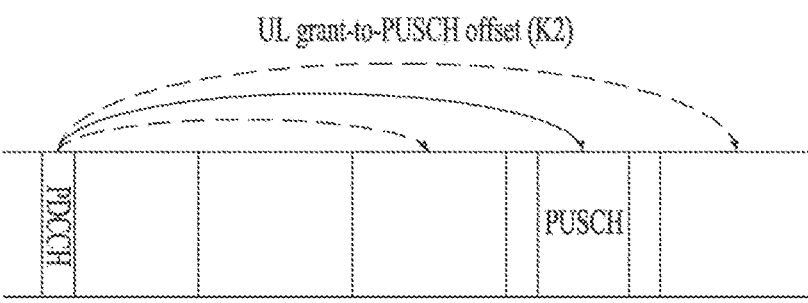
(b)

FIG. 14
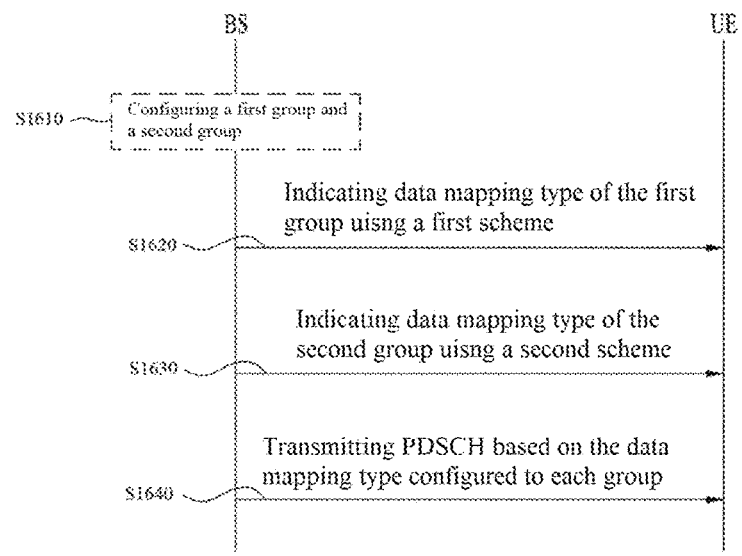
(a)
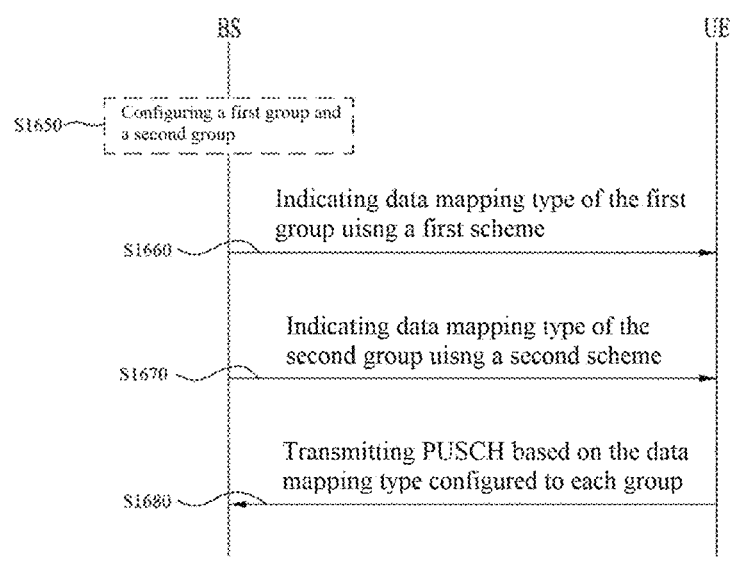
(b)

METHOD FOR TRANSMITTING AND RECEIVING SIGNAL IN WIRELESS COMMUNICATION SYSTEM FOR SUPPORTING UNLICENSED BAND, AND DEVICE FOR SUPPORTING SAME

CROSS-REFERENCE TO RELATED APPLICATIONS

This application is a National Stage application under 35 U.S.C. § 371 of International Application No. PCT/KR2019/010073, filed on Aug. 9, 2019, which claims the benefit of U.S. Provisional Application No. 62/716,920, filed on Aug. 9, 2018. The disclosures of the prior applications are incorporated by reference in their entirety.

TECHNICAL FIELD

The present disclosure relates to a method and apparatus used in a wireless communication system, and more particularly, to a method and apparatus for transmitting and receiving a signal in a wireless communication system supporting an unlicensed band.

BACKGROUND ART

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

Provided are a method and apparatus for transmitting and receiving a signal in a wireless communication system supporting an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system supporting an unlicensed band.

In an aspect of the present disclosure, a communication method of an apparatus in a wireless communication system includes receiving demodulation reference signal (DMRS) configuration information, receiving scheduling information for a plurality of transmission time intervals (TTIs), and transmitting data in a plurality of consecutive TTIs based on the DMRS configuration information. First DMRS configuration information in the DMRS configuration information is applied to a first group in the plurality of consecutive TTIs, and second DMRS configuration information in the DMRS configuration information is applied to a second group in the plurality of consecutive TTIs.

In an aspect of the present disclosure, an apparatus used in a wireless communication system includes a memory and a processor. The processor is configured to receive DMRS configuration information, receive scheduling information for a plurality of TTIs, and transmit data in a plurality of consecutive TTIs based on the DMRS configuration information. First DMRS configuration information in the DMRS configuration information is applied to a first group in the plurality of consecutive TTIs, and second DMRS configuration information in the DMRS configuration information is applied to a second group in the plurality of consecutive TTIs.

The first group and the second group may be distinguished in various methods according to TTI types.

For example, a TTI with all symbols contiguously allocated for data transmission may belong to the first group, and a TTI with some symbols allocated for data transmission may belong to the second group.

For example, the first group may include starting and ending TTIs of the plurality of consecutive TTIs, and the second group may include remaining TTIs except for the starting TTI and the ending TTI in the plurality of consecutive TTIs.

For example, the first group may include a starting TTI of the plurality of consecutive TTIs, and the second group may include remaining TTIs except for the starting TTI in the plurality of consecutive TTIs.

The first DMRS configuration information and the second DMRS configuration information may be received in different methods.

For example, the first DMRS configuration information may be received by a higher-layer signal, and the second DMRS configuration information may be received on a downlink control channel, or vice versa.

A plurality of candidates for a combination of a DMRS configuration applicable to the first group and a DMRS configuration applicable to the second group may be received by a higher-layer signal, and one of the plurality of candidates may be received on a downlink control channel, for application to the data transmission.

The DMRS configuration information may include information about at least one of a data mapping type based on the position of a symbol carrying a DMRS, the number of DMRS antenna ports, or the number of DMRS symbols.

The apparatus applied to the embodiments of the present disclosure may include an autonomous driving vehicle.

The above-described aspects of the present disclosure are only some of the preferred embodiments of the present disclosure, and various embodiments reflecting the technical features of the present disclosure will be described in detail below may be derived and understood by those skilled in the art.

Advantageous Effects

According to the embodiments of the present disclosure, a plurality of consecutive transmission time intervals (TTIs) may be efficiently scheduled in an unlicensed band.

According to the embodiments of the present disclosure, when a base station (BS) indicates data scheduling in a plurality of consecutive TTIs to a user equipment (UE), the BS may efficiently indicate a data mapping type in consideration of a TTI type.

According to the embodiments of the present disclosure, when a BS indicates data scheduling in a plurality of consecutive TTIs to a UE, the BS may efficiently indicate information related to demodulation reference signal (DMRS) transmission in consideration of a TTI type.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 7 is a diagram illustrating a wireless communication system supporting an unlicensed band;

FIGS. 10 to 16 are diagrams illustrating embodiments of the present disclosure;

BEST MODE

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA). CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA). UTRA is a part of universal mobile telecommunications system (UMTS). 3rd generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
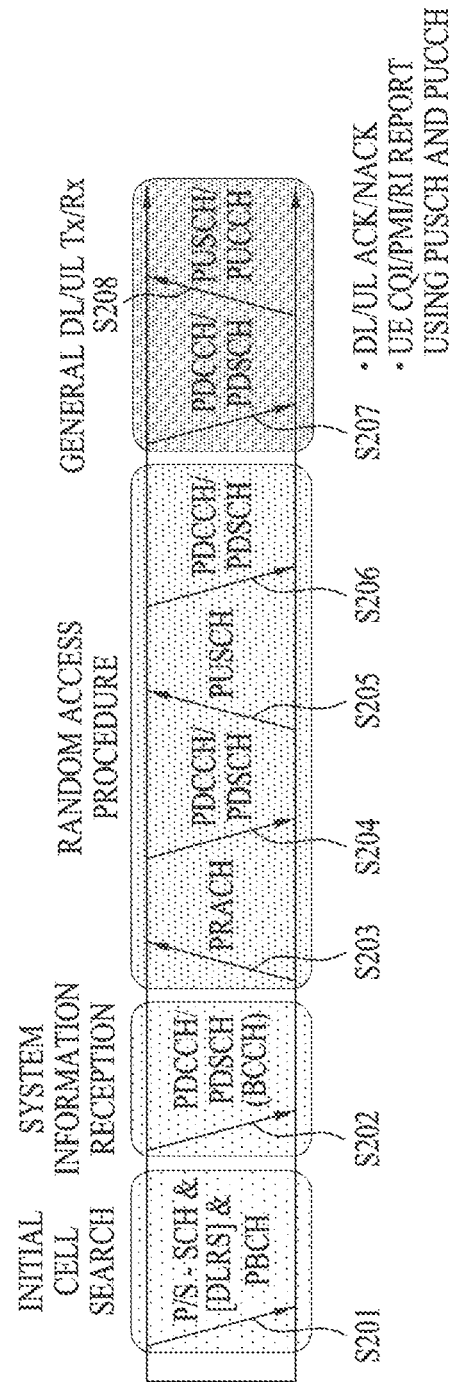
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

In an unlicensed band of the NR system, the random access procedure may be performed in two steps. For example, the UE may transmit Message 1 to the BS and receive Message 2 from the BS in response to Message 1. In this case, Message 1 may be a combination of the preamble (S13) and PUSCH transmission (S15), and Message 2 may be a combination of the RAR (S14) and collision resolution message (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
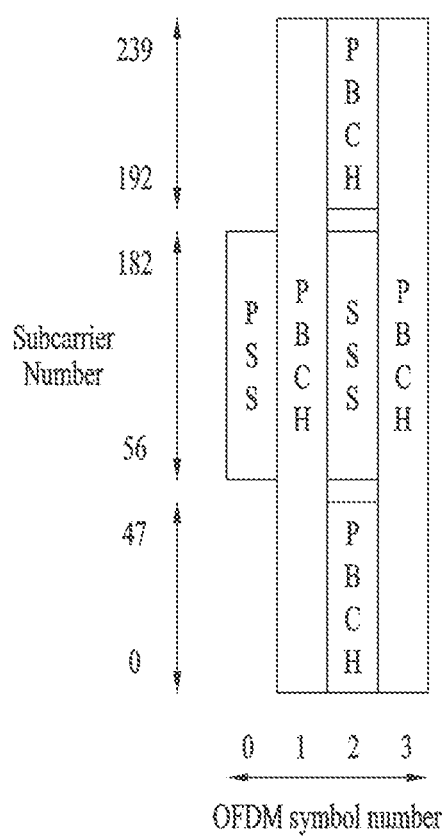
FIG. 2 is a diagram illustrating a structure of a synchronization signal block (SSB).

FIG. 2 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 2, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 1 below.

TABLE 1

| | Type of Signals | Operations |
|---|---|---|
| 1$^{st}$ step | PSS | * SS/PBCH block (SSB) symbol timing acquisition<br>* Cell ID detection within a cell ID group (3 hypothesis) |
| 2$^{nd}$ Step | SSS | * Cell ID group detection (336 hypothesis) |
| 3$^{rd}$ Step | PBCH DMRS | * SSB index and Half frame (HF) index (Slot and frame boundary detection) |
| 4$^{th}$ Step | PBCH | * Time information (80 ms, System Frame Number (SFN), SSB index, HF)<br>* Remaining Minimum System Information (RMSI)<br>Control resource set (CORESET)/Search space configuration |
| 5$^{th}$ Step | PDCCH and PDSCH | * Cell access information<br>* RACH configuration |

There may be 336 cell ID groups, and each cell ID group may have three cell IDs. There may be 1008 cell IDs in total.

Figure 3:
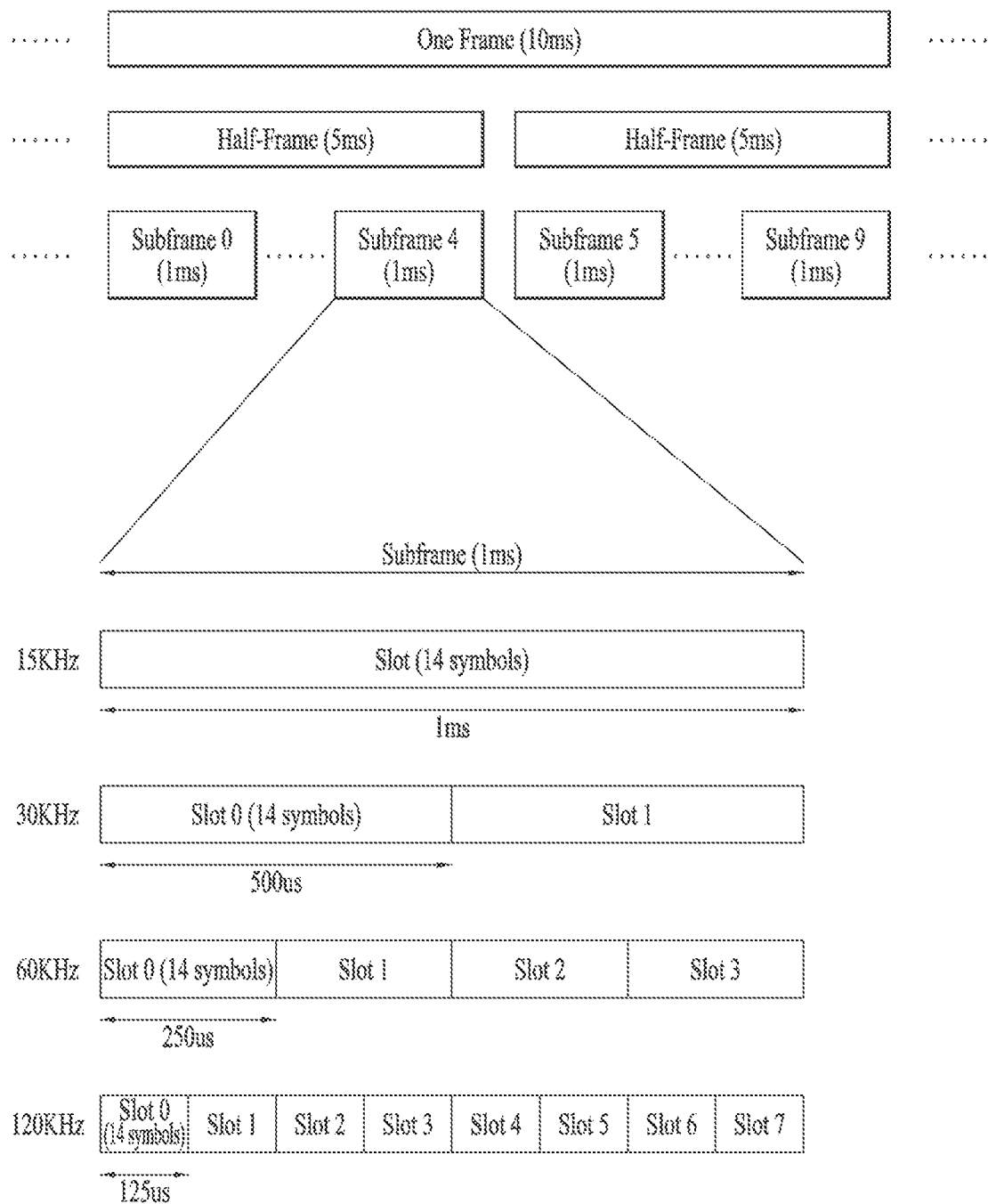
FIG. 3 is a diagram illustrating a radio frame structure.

FIG. 3 is a diagram illustrating the structure of a radio frame.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

In the NR system, different OFDM(A) numerologies (e.g., SCS, CP length, etc.) may be configured for a plurality of cells aggregated for one UE. Thus, the (absolute time) duration of a time resource (e.g., subframe (SF), slot, or TTI) including the same number of symbols may differ between the aggregated cells (for convenience of description, such a time resource is commonly referred to as a time unit (TU)).

Figure 4:
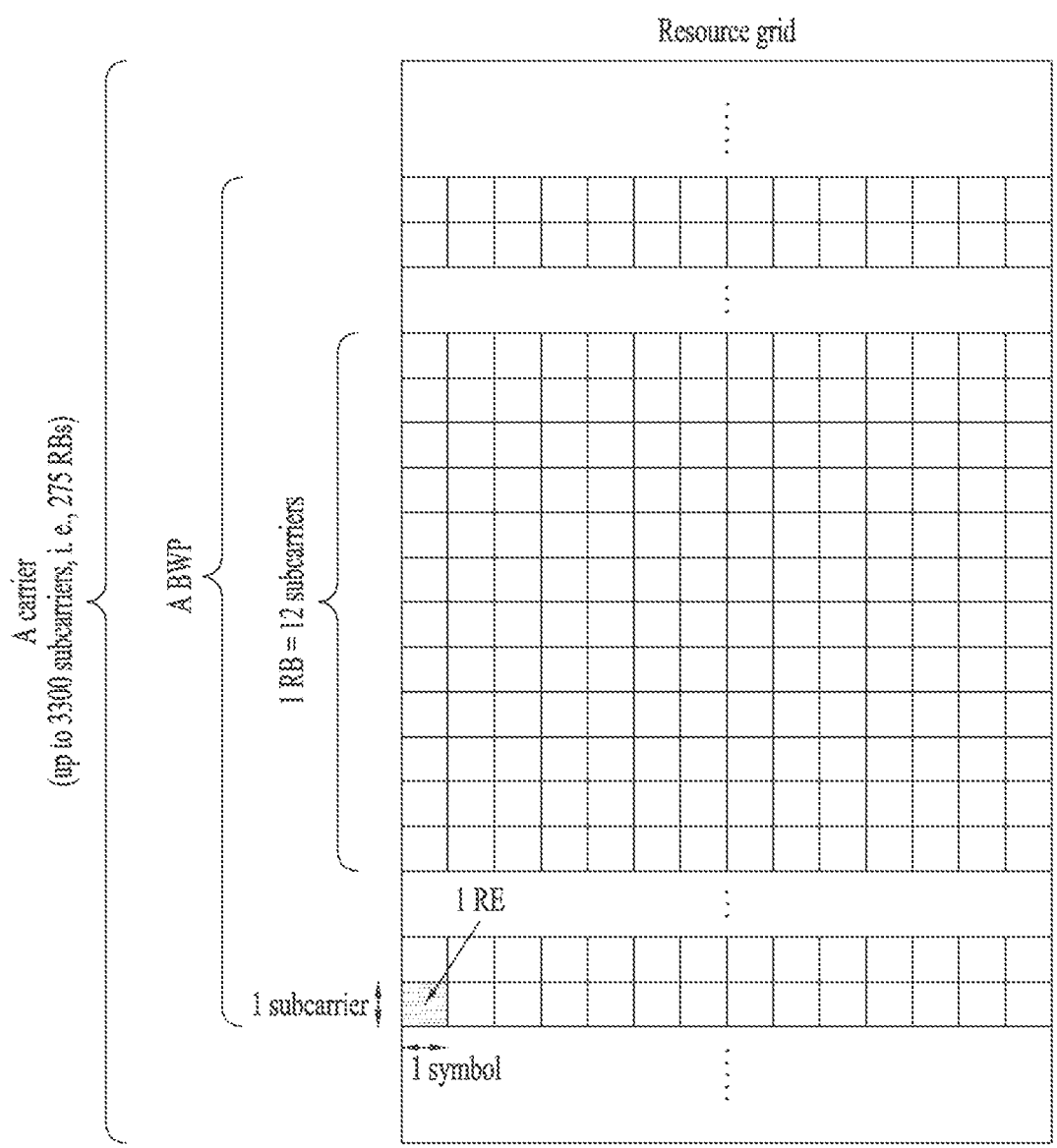
FIG. 4 is a diagram illustrating a resource grid during the duration of a slot.

FIG. 4 illustrates a resource grid of a slot.

One slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 5:
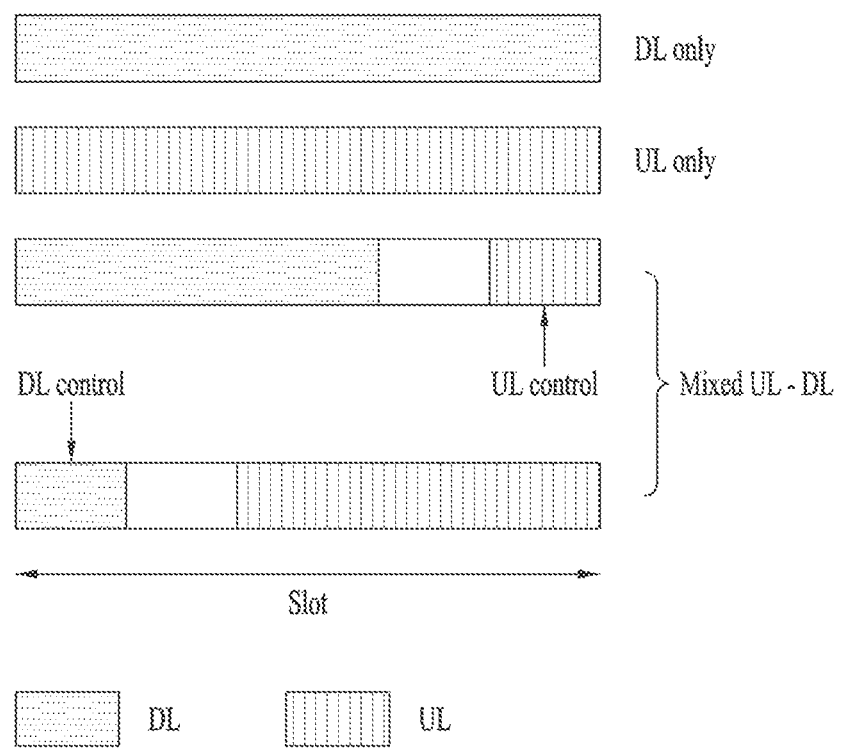
FIG. 5 is a diagram illustrating a self-contained slot structure.

FIG. 5 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 6:
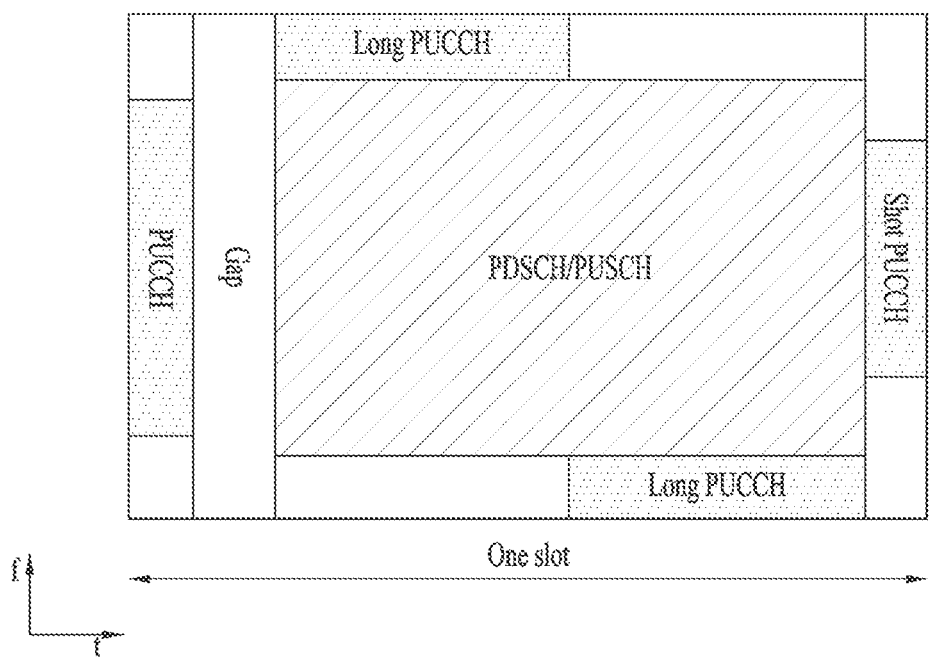
FIG. 6 is a diagram illustrating mapping of physical channels in a self-contained slot.

1. DL only configuration
  2. UL only configuration
  3. Mixed UL-DL configuration
     DL region+Guard period (GP)+UL control region
     DL control region+GP+UL region
        DL region: (i) DL data region, (ii) DL control region+DL data region
        UL region: (i) UL data region, (ii) UL data region+UL control region FIG. 6 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.

monitoringSlotPeriodicityAndOffset: this indicates a PDCCH monitoring periodicity (on a slot basis) and a PDCCH monitoring period offset (on a slot basis).

monitoringSymbolsWithinSlot: this indicates PDCCH monitoring symbols in a slot (e.g., first symbol(s) in the CORESET).

nrofCandidates: this denotes the number of PDCCH candidates for each AL={1, 2, 4, 8, 16} (one of 0, 1, 2, 3, 4, 5, 6, and 8).

An occasion (e.g., time/frequency resource) for monitoring PDCCH candidates is defined as a PDCCH (monitoring) occasion. One or more PDCCH (monitoring) occasions may be configured in a slot.

Table 2 shows the characteristics of each SS.

TABLE 2

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 3 shows DCI formats transmitted on the PDCCH.

TABLE 3

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ. [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DET-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

Further, when a packet is transmitted in a mobile communication system, a method of increasing data transmission/reception efficiency by adopting multiple transmission antennas and multiple reception antennas is used. When a transmitter or a receiver transmits or receives data through multiple antennas to increase capacity or performance, the receiver may receive a correct signal only when the receiver is aware of a channel state between each transmission antenna and each reception antenna from a reference signal (RS) provided for each transmission antenna.

In the mobile communication system, RSs may be classified into two types according to their purposes: RS for channel information acquisition and RS for data demodulation. The former needs to be transmitted in a wide band as it is used for a UE to acquire channel information on DL transmission and received by a UE even if the UE does not receive DL data in a specific subframe. This RS is also used for measurement as in a handover situation. The latter is transmitted along with a corresponding resource by a BS when the BS transmits a DL signal and is used for a UE to demodulate data through channel measurement. This RS needs to be transmitted in a region in which data is transmitted.

The 3GPP standardization organization has been working on standardization of a 5G wireless communication system known as New RAT (hereinafter, referred to as NR). The 3GPP NR system supports a plurality of logical networks in a single physical system. Therefore, the NR system is designed to support services having various requirements (e.g., eMBB, mMTC, and URLLC) by changing a TTI and an OFDM numerology (e.g., an OFDM symbol duration and an SCS). Along with the rapid growth of data traffic due to the recent emergence of smart devices, a method of using a U-band in cellular communication is also considered for the 3GPP NR system, similarly to LAA in the legacy 3GPP LTE system. Unlike LAA, an NR cell of an unlicensed band (hereinafter, referred to as NR UCell) aims to support a standalone operation. For example, PUCCH, PUSCH, and PRACH transmissions from a UE may be supported in the NR UCell.

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 6 (a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 6 (a) corresponds to the LAA of the 3GPP LTE system. FIG. 6 (b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

The BS may perform one of the following unlicensed band access procedures (e.g., CAPs) to transmit a DL signal in the unlicensed band.

(1) First DL CAP Method

Figure 8:
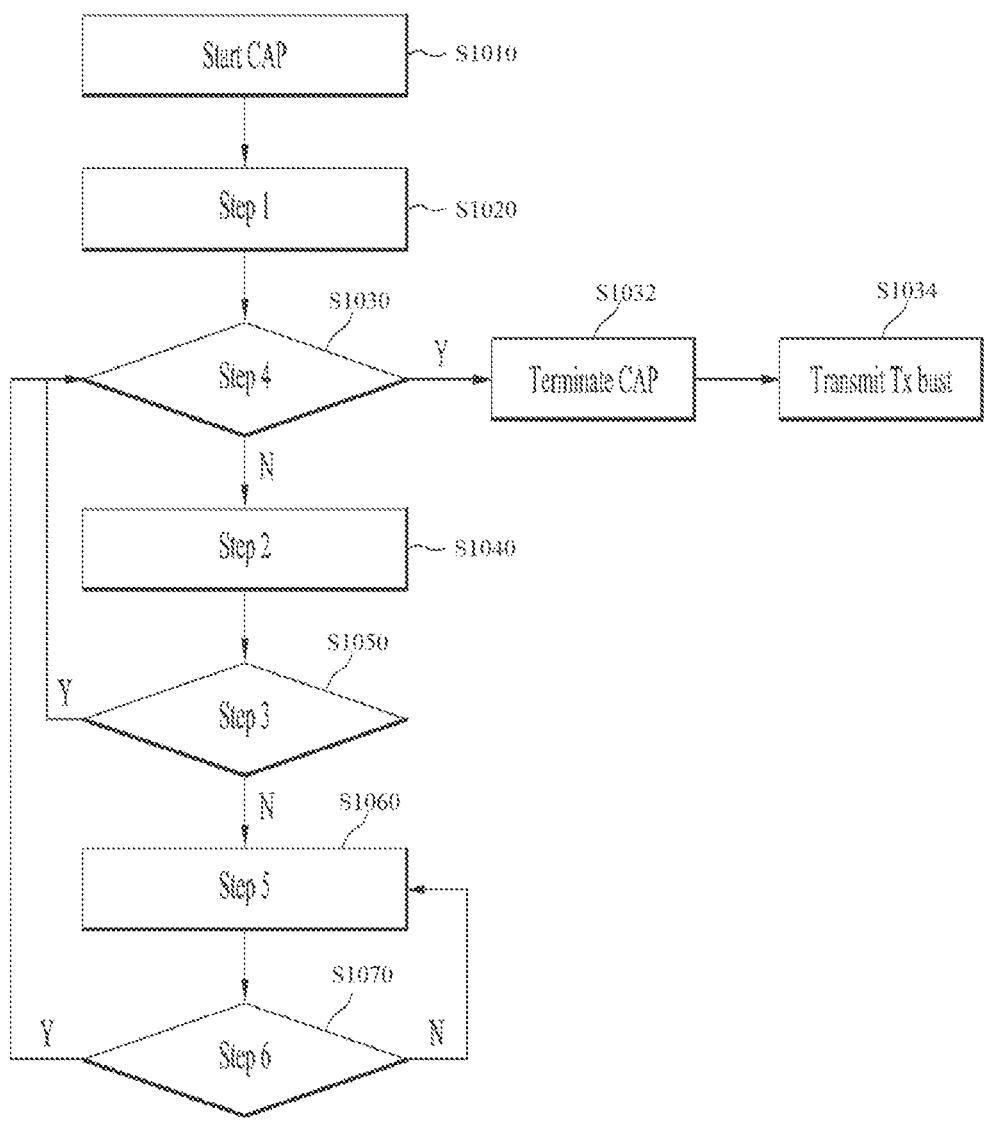
FIG. 8 is a diagram illustrating a channel access procedure (CAP) of a base station (BS) for downlink signal transmission in an unlicensed band.

FIG. 8 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1110). The BS may randomly select a backoff counter N within a contention window (CW) according to step 1. N is set to an initial value $N_{init}$ (S1120). $N_{init}$ is a random value selected from the values between 0 and $CW_p$. Subsequently, when the backoff counter value N is 0 according to step 4 (S1130; Y), the BS terminates the CAP (S1132). The BS may then perform a Tx burst transmission including transmission of a PDSCH/PDCCH/EPDCCH (S1134), On the contrary, when the backoff counter value N is not 0 (S1130; N) the BS decrements the backoff counter value by 1 according to step 2 (S1140). Subsequently, the BS checks whether the channel of U-cell(s) is idle (S1150). If the channel is idle (S1150; Y), the BS determines whether the backoff counter value is 0 (S1130). On the contrary, when the channel is not idle, that is, the channel is busy (S1150; N), the BS determines whether the channel is idle during a longer defer duration $T_d$ (25 usec or longer) than a slot duration (e.g., 9 usec) according to step 5 (S1160). If the channel is idle during the defer duration (S1170; Y), the BS may resume the CAP. The defer duration may include a 16-usec duration and the immediately following $m_p$ consecutive slot durations (e.g., each being 9 usec). On the contrary, if the channel is busy during the defer duration (S1170, N), the BS re-checks whether the channel of the U-cell(s) is idle during a new defer duration by performing step S1160 again.

Table 5 illustrates that $m_p$, a minimum CW, a maximum CW, a maximum channel occupancy time (MCOT), and an allowed CW size applied to a CAP vary according to channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. Tars includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

determined according to step 4 that the backoff counter value (N) is 0 (YES in S1230), the UE terminates the CAP (S1232). Then, the UE may perform Tx burst transmission (S1234). If the backoff counter value is non-zero (NO in S1230), the UE decreases the backoff counter value by 1 according to step 2 (S1240). The UE checks whether the channel of U-cell(s) is idle (S1250). If the channel is idle (YES in S1250), the UE checks whether the backoff counter value is 0 (S1230). On the contrary, if the channel is not idle in S1250, that is, if the channel is busy (NO in S1250), the UE checks whether the corresponding channel is idle for a defer duration $T_d$. (longer than or equal to 25 usec), which is longer than a slot duration (e.g., 9 usec), according to step 5 (S1260). If the channel is idle for the defer duration (YES in S1270), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1270), the UE performs step S1260 again to check whether the channel is idle for a new defer duration.

Table 6 shows that the values of $m_p$, a minimum CW, a maximum CW, a maximum channel occupancy time (MCOT), and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 9:
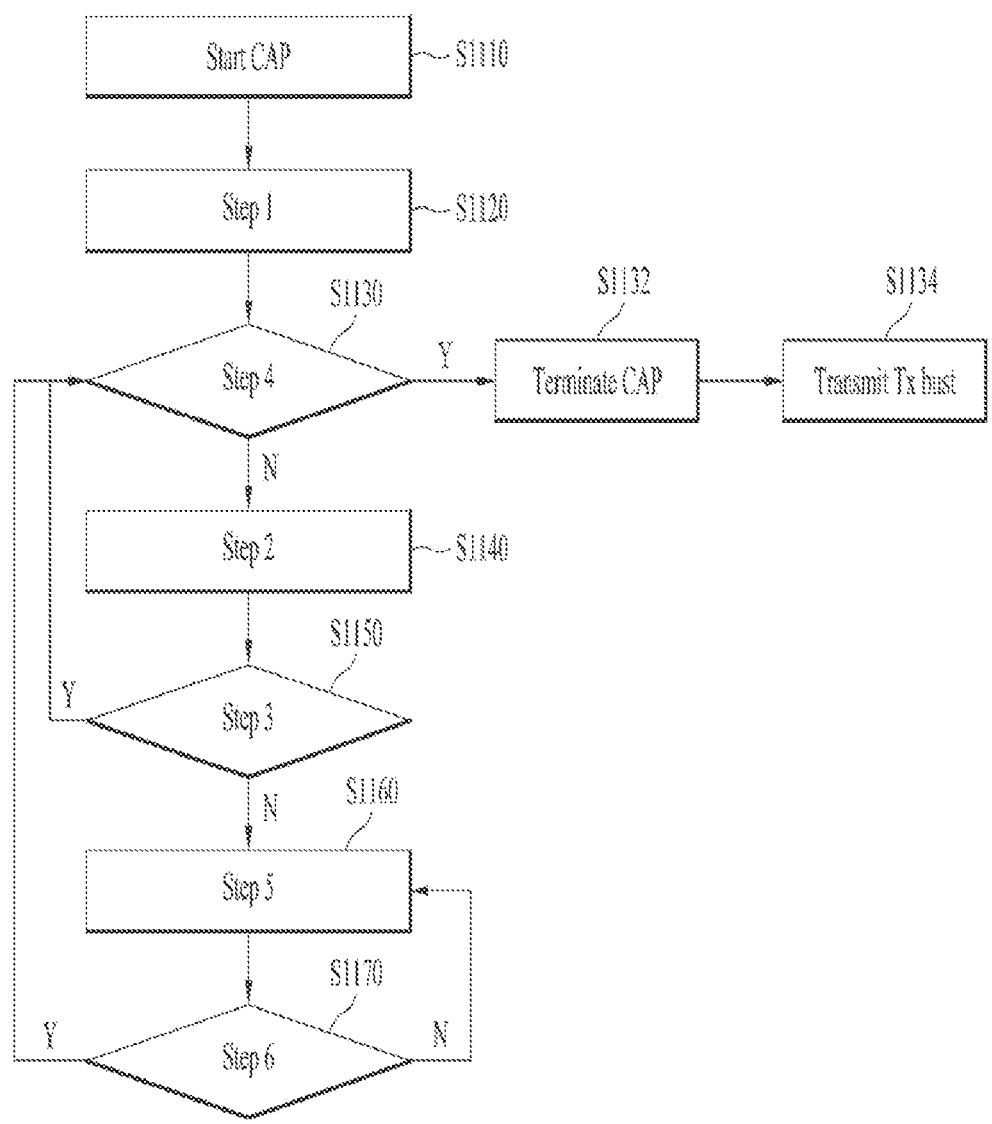
FIG. 9 is a diagram illustrating a CAP of a user equipment (UE) for uplink signal transmission in an unlicensed band.

FIG. 9 is a flowchart illustrating UE's Type 1 CAP operation for UL signal transmission.

To transmit a signal in the U-band, the UE may initiate a CAP (S1210). The UE may randomly select a backoff counter N within a contention window (CW) according to step 1. In this case, N is set to an initial value $N_{init}$ (S1220). $N_{init}$ may have a random value between 0 and $CW_p$. If it is The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class $p \in \{1, 2, 3, 4\}$. Otherwise, the UE may increase $CW_p$ for every priority class $p \in \{1,2,3,4\}$ to a next higher allowed value.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

The present disclosure proposes a method of transmitting data in a plurality of transmission time intervals (TTIs) or a plurality of slots in an unlicensed band by a UE in a wireless communication system including BSs and UEs. A TTI or a slot is a basic time resource unit for data scheduling. A single TTI or slot may include a plurality of (OFDM) symbols.

For an LBT operation, a communication node should use certain time resources for a CS operation. Accordingly, minimization of LBT attempts of the communication node during signal transmission may be preferable in terms of efficient use of time resources in an LBT-based wireless communication system. In this context, the present disclosure proposes a method of supporting multi-TTI scheduling that schedules data transmission in a plurality of TTIs or a plurality of slots in an NR U-cell by a scheduling indication (in a single DCI or PDCCH). It may be assumed that a plurality of scheduled TTIs or slots are consecutively allocated. While the proposed operations of the present disclosure are described as embodiments for the NR system, the present disclosure may be extended to any wireless communication system supporting multi-TTI scheduling. In the following description, the starting TTI or starting slot of the plurality of scheduled TTIs or slots may be determined based on information included in a PDCCH (e.g., when delay information included in DCI is '4', slot #n+4 may be determined as the starting slot based on slot #n carrying the PDCCH). In another example, a predefined slot may be determined as the starting slot. Further, it is assumed in the following description that the number of a plurality of TTIs or slots scheduled for a PDSCH (or PUSCH) is given by a PDCCH, higher-layer signaling (e.g., RRC signaling), or any other predefined criterion.

[Proposed Method #1] Method of Allocating Time Resources (on a TTI Basis)

In an NR system according to an embodiment of the present disclosure, a BS uses a start-length resource indication value (SLIV) scheme to allocate time resources to a PDSCH (or PUSCH) in a single slot or TTI. An SLIV is a specific value indicating a combination of the index of a starting symbol and the number of consecutive symbols allocated for data transmission from the starting symbol (the length of time resources for the data transmission) in a slot or TTI, in resource allocation to a PDSCH (or PUSCH) in the time domain.

Once S0 and L0 for one slot are given, the ending symbol E0 of the data transmission may be known. For example, if S0=1 and L0=8 (L0>=1), then E0=8. That is, E0=S0+L0−1 (L0>=1). If L0 is set to a value of 0 or larger, E0=S0+L0.

Conventionally, when the BS indicates an SLIV value corresponding to {S0, L0} for a single slot to the UE, the UE transmits or receives data in as many consecutive symbols as L0 from a symbol index S0 in the slot.

In view of the nature of a U-band in which LBT is performed for data transmission, multi-TTI scheduling for a plurality of TTIs is considered in embodiments of the present disclosure. Therefore, when multi-TTI scheduling is indicated, extension of the legacy SLIV scheme for allocating time resources in a single slot/single TTI to a scheme of allocating time resources in a plurality of slots should be considered.

In the present disclosure, it is proposed that when a BS indicates data scheduling in a plurality of TTIs or slots to a UE, time resources for data transmission in the plurality of TTIs or slots are allocated/interpreted in one or more of the following methods.

(1) Opt. 1-1

A. The BS may indicate a single combination (e.g., {S0, L0}) of the index of a starting symbol and the length of time resources (i.e., the number of consecutive symbols from the starting symbol) for data transmission, and the UE may interpret the information as follows.

i. It may be interpreted that as many (consecutive) time resources as the length L0 from the symbol index S0 have been allocated in each TTI.

ii. It may be assumed that a PDSCH (or PUSCH) transmission is performed on a TTI basis within the time resources.

For example, indicating a single combination {S0, L0} for a plurality of scheduled consecutive TTIs to the UE by the BS may amount to allocating as many time resources as the length L0 from the symbol index S in each of the plurality of TTIs. The allocated time resources may be contiguous as long as L0 in each TTI and non-contiguous between TTIs. That is, the UE may receive a PDSCH or transmit a PUSCH during the duration of L0 starting from symbol S0 in each of the plurality of scheduled TTIs. In the NR system, a URLLC transmission is performed by puncturing resources of a pre-scheduled DL data transmission. Therefore, the pre-scheduled DL data may be lost more or less. According to option 1-1, since non-contiguous resources are allocated for data transmission and reception in a plurality of TTIs in the U-band, the URLLC transmission during a time period without mapped data may minimize the loss of the pre-scheduled data.

(2) Opt. 1-2

A. When the BS indicates a single combination (e.g., {S0, L0}) of the index of a starting symbol and the length of time resources (i.e., the number of consecutive symbols from the starting symbol) for data transmission, the UE interprets the information as follows.

i. If L0 is a positive number, it is interpreted that (contiguous) time resources from S0 in the first TTI to E0 in the last TTI have been allocated.

ii. If L0 is a negative number, it is interpreted that (contiguous) time resources from E0 in the first TTI to S0 in the last TTI have been allocated.

iii. E0 is calculated by E0=S0+|L0| or E0=S0+|L0|−1 (that is, E0 is calculated by using the absolute value of L0, regardless of whether L0 is negative or positive). If L0 is positive, E0 represents the index of an ending symbol in the last TTI, and if L0 is negative, E0 represents the index of the starting symbol in the first TTI.

iv. It is assumed that a PDSCH (or PUSCH) transmission is performed on a TTI basis within the time resources.

In the case of {S0, L0} in a single slot, L0 may not be a negative value. For a plurality of slots, however, L0 may not be interpreted as the length of time resources in one slot. Therefore, L0 may be a negative value.

(3) Opt. 1-3

A. The BS indicates a single combination (e.g., {S0, L0}) of the index of a starting symbol and the length of time resources for data transmission and mirroring information (e.g., on/off), and the UE interprets the information as follows.

i. When mirroring is 'off', it is interpreted that (contiguous) time resources from S0 in the first TTI to E0 in the last TTI have been allocated.

ii. When mirroring is 'on', it is interpreted that (contiguous) time resources from E0 in the first TTI to S0 in the last TTI have been allocated.

iii. E0 is calculated by S0+L0 or S0+L0−1. Further, if mirroring is 'off', E0 means the index of an ending symbol in the last TTI, and if mirroring is 'on', E0 means the index of the starting symbol in the first TTI.

iv. It is assumed that a PDSCH (or PUSCH) transmission is performed on a TTI basis within the time resources.

That is, the BS may add a 1-bit indication of on/off as mirroring information in addition to an {S0, L0} combination.

Figure 10:
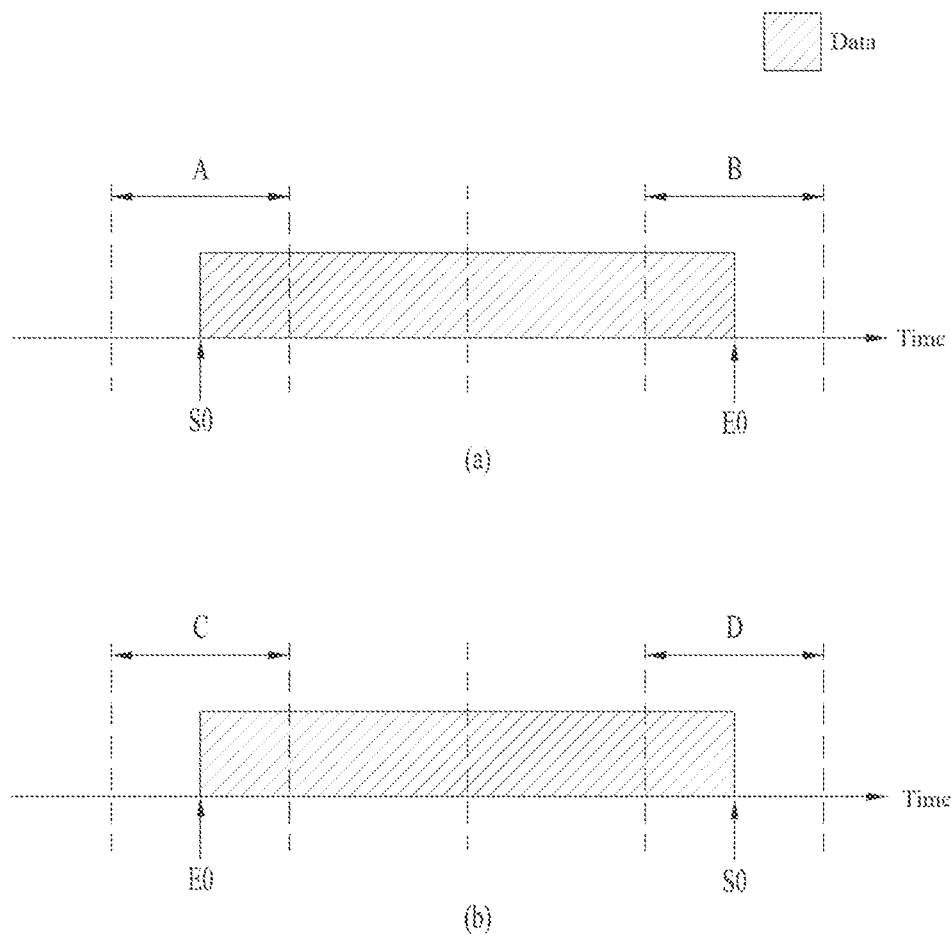

FIG. 10 illustrates a method of allocating time resources in a plurality of TTIs according to mirroring on/off. FIG. 10(a) illustrates that when mirroring is 'off', time resources from the symbol index S0 in the first TTI A to the symbol index E0 of the last TTI B have been allocated. FIG. 10(b)

illustrates that when mirroring is 'on', time resources from the symbol index E0 of the first TTI C to the symbol index S0 of the last TTI D have been allocated.

The BS may indicate mirroring on/off information by adding 1 bit. For example, the BS may indicate mirroring on or off by using a bit value of '0' or '1'.

(4) Opt. 1-4

A. The BS indicates N combinations for N TTIs, each combination being the index of a starting symbol and the length of time resources for data transmission (e.g. {S0, L0}, {S1, L1}, ..., {SN−1, LN−1}), and the UE interprets the information as follows.

i. It is interpreted that (contiguous) time resources of a length Ln from Sn (n=0, 1, ..., N−1) have been allocated in each $n^{th}$ TTI.

ii. It is assumed that a PDSCH (or PUSCH) transmission is performed on a TTI basis within the time resources.

Compared to other options in which one SLIV is applied commonly to a plurality of TTIs, option 1-4 is a method of indicating an SLIV corresponding to each of a plurality of scheduled TTIs to the UE. Despite the benefit of flexible scheduling for each TTI, option 1-4 may increase the overhead of scheduling information in view of the indication of as many SLIVs as the number of TTIs.

(5) Opt. 1-5

A. The BS indicates a single combination (e.g., {S0, L0}) of the index of a starting symbol and the length of time resources for data transmission, and the UE interprets the information as follows.

i. As many time resources as a multiple of the length L0 from the symbol index S0 in the first TTI have been allocated.

ii. It is assumed that a PDSCH (or PUSCH) transmission is performed on an L0 unit basis within the time resources.

For example, it may be interpreted that data is transmitted/received in as many time resources as a multiple of L0 from a starting symbol index S0 in a scheduled first TTI. Information about the multiple (e.g., N) may be indicated to the UE, together with information about the number of a plurality of scheduled TTIs or slots (e.g., on a PDCCH, by RRC signaling, or according to a predefined criterion).

According to option 1-5, it may be interpreted that data is transmitted and received in as many time resources as a multiple of L0 from the starting symbol index S0 in the scheduled first TTI, without calculation of E0 in the scheduled last TTI.

(6) Opt. 1-6

A. The BS indicates a single combination (e.g., {S0, L0}) of the index of a starting symbol and the length of time resources for data transmission, and the UE interprets the information as follows.

i. It is interpreted that (contiguous) time resources from S0 in the first TTI to E0 in the last TTI have been allocated.

ii. E0 represents the index of an ending symbol, and is calculated by E0=(S0+L0) mod S where S is related to the number of symbols in a slot or TTI, and may represent the total or maximum number of symbols in the slot or TTI. A value of 'S0+L0' equal to or larger than S may be allocated. For example, in the case of a legacy SLIV applied to a single slot, since S0 and E0 are located in the same slot, the value of 'S0+L0' may not exceed the total number of symbols in the single slot. However, since the SLIV is applied to a plurality of TTIs in the present disclosure, E0 and S0 may be located in different TTIs. Therefore, the value of 'S0+L0' may exceed the total number of symbols in a single TTI.

iii. It is assumed that a PDSCH (or PUSCH) transmission is performed on a TTI basis in the time resources.

Option 1-6 may serve as a scheme of signaling an E0 value smaller than an S0 value, when a plurality of TTIs or slots are scheduled. An ending symbol may not precede a starting symbol in one slot. That is, the index E0 of the ending symbol in one slot may not be less than the index S0 of the starting symbol in the slot.

However, since a plurality of TTIs or a plurality of slots may be configured for data transmission to provide a plurality of LBT opportunities in the U-band, S0 and E0 may be located in different TTIs or slots. Therefore, since the index E0 in one slot may be smaller than the index S0 located in another slot, there is a need for a method of signaling an E0 value smaller than an S0 value.

For example, if S=14, S0=7, and L0=8, E0=1 according to the formula in option 1-6. Therefore, E0 smaller than S0 may be signaled according to option 1-6.

The BS may support one or more of the above options, and indicate information about an actually used option to the UE by a higher-layer signal and/or DCI. However, when the BS indicates one or more combinations to the UE, each combination being the index of a starting symbol and the length of time resources for data transmission, the BS may configure combination candidates by higher-layer signaling such as RRC signaling and then indicate one combination candidate of the combination candidates by DCI. The total number of TTIs from the first TTI to the last TTI may be predetermined or configured by separate signaling (e.g., DL grant DCI).

The above options are summarized as follows.

When the BS indicates a single combination of the index of a starting symbol and a data transmission length (e.g., {S0, L0}), the UE may interpret the combination as allocation of as many time resources as a length L0 from a starting symbol S0 for data transmission and reception in each of a plurality of scheduled TTIs (option 1-1).

Conventionally, the index of the ending symbol and the index of the starting symbol according to an SLIV are values for data transmission in the same slot or TTI. Therefore, the relationship that the index of the ending symbol > the index of the starting symbol is established. However, in the extended resource allocation scheme for multi-TTI scheduling, the index of the starting symbol is applied only to the first TTI and the index of the ending symbol is applied only to the last TTI. Accordingly, the relationship that the index of the ending symbol ≤ the index of the starting symbol may also be established. To represent the relationship in the SLIV scheme according to an embodiment of the present disclosure, it may be considered that L0 having a negative value is indicated (option 1-2), or the index of the starting symbol and the index of the ending symbol are to the last TTI and the first TTI, respectively by a mirroring operation (option 1-3).

As a more generalized method, the BS may indicate N combinations for N TTIs, each combination being the index of a starting symbol and a data transmission length (e.g., {S0, L0}, {S1, L1}, {SN-1, LN-1}) (option 1-4). The BS may configure combination candidates by higher-layer signaling such as RRC signaling and then indicate one combination candidate of the combination candidates by DCI.

Proposed method #1 may be applied in combination with other proposed methods of the present disclosure, unless contradicting each other.

[Proposed Method #2] Method of Determining a Transport Block Size (TBS)

When the BS indicates data scheduling in a plurality of TTIs or slots to the UE, and when the BS determines a TBS based on a modulation and coding scheme (MCS) and the number $NR_E$ of REs available for data allocation in a PDSCH (or PUSCH), a TBS may be allocated (on a TTI basis) for the plurality of TTIs or slots for data transmission in one or more of the following methods.

(1) Opt. 2-1: A TBS is determined (for each TTI) according to $N_{RE}$ in a PDSCH (or PUSCH) transmission period of each TTI.

A. However, $NR_E$ may be calculated as follows.

i. $NR_E=N_{SC}*N_{SYMB}-N_{DMRS}+N_{OH}$

1. $N_{SC}$: The number of subcarriers allocated as PDSCH (or PUSCH) transmission resources 2. $N_{SYMB}$: The number of symbols allocated as PDSCH (or PUSCH) transmission resources 3. $N_{DMRS}$: The number of REs for DMRS transmission in PDSCH (or PUSCH) transmission resources 4. $N_{OH}$: The number of REs used to reflect overhead, configured by a higher-layer signal (e.g., RRC signal)

ii. The value of $N_{OH}$ may be independently set and applied on a TTI basis (or on a transmission type basis (e.g., partial TTI or full TTI) in a TTI).

iii. $N_{SC}$ and/or $N_{SYMB}$ may be determined based on scheduled PDSCH (or PUSCH) transmission resources regardless of actual transmission. Alternatively, when some symbol(s) in the PDSCH (or PUSCH) transmission resources (scheduled) by LBT is punctured, the symbol(s) may still be included in $N_{SYMB}$, whereas when the symbol(s) is rate-matched, the symbol(s) may be excluded from $N_{SYMB}$.

For example, a TBS is calculated to calculate resources instantaneously in the NR system. In this case, the TBS is calculated based on a single TTI. In the present disclosure, the TBS may be calculated in consideration of the characteristics of a U-band in which a plurality of TTIs may be configured.

Figure 11:
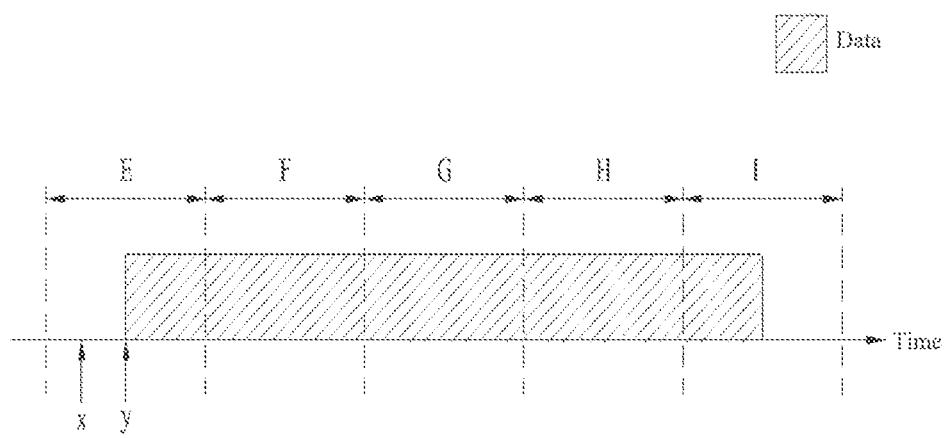

Referring to FIG. 11, TTIs F, G, and H, each having all symbols continuously allocated for data transmission, may be referred to as full TTIs. A TTI with some symbols allocated for data transmission may be referred to as a partial TTI. Thus, TTIs E and I in which data transmission starts or ends in the middle may be partial TTIs. The TTIs E and I may be the first TTI and the last TTI, respectively. The first and last ones of a plurality of consecutive TTIs may be full TTIs, not necessarily partial TTIs.

Two LBT opportunities may be available in the first TTI E because two starting symbol candidates x and y for data transmission are signaled. Although the data transmission actually starts in the symbol y due to successful LBT, if the starting symbol of the scheduled PUSCH transmission is x, $N_{SYMB}$ may be determined based on x regardless of the actual transmission.

(2) Opt. 2-2: A (single) TBS is determined based on $N_{RE}$ in a PDSCH (or PUSCH) transmission period within a (reference) TTI.

A. A (reference) TTI among scheduled TTIs may be selected as one of the following TTIs.

i. Opt. 2-2-1: First TTI ii. Opt. 2-2-2: Last TTI iii. Opt. 2-2-3: Partial TTI iv. Opt. 2-2-4: Full TTI v. Opt. 2-2-5: TTI with a minimum scheduled PDSCH (or PUSCH) transmission period vi. Opt. 2-2-6: TTI with a maximum scheduled PDSCH (or PUSCH) transmission period B. The (single) TBS may be equally applied to a PDSCH (or PUSCH) in each of the plurality of TTIs.

For example, resources such as the number of symbols carrying data in a TTI may be different depending on whether the TTI is a full TTI, a partial TTI, a first TTI, or a last TTI. Accordingly, one TTI may be selected as a reference TTI, and a TBS calculated based on the reference TTI may be applied commonly to the other TTIs according to option 2-2. The reference TTI may be selected according to option 2-2-1 to option 2-2-6.

(3) Opt. 2-3: A (single) TBS is determined according to $N_{RE}$ based on the transmission length L of a (single) PDSCH (or PUSCH), indicated by the BS.

A. A PDSCH (or PUSCH) may be transmitted in an L-symbol unit, and a plurality of PDSCHs (or PUSCHs) may be transmitted in a plurality of (consecutive) L-symbol units, with a TTI (or slot) boundary ignored.

B. The (single) TBS may be applied commonly to a PDSCH (or PUSCH) in each of the plurality of L-symbol units.

Given $N_{RE}$, a TBS may be expressed as $N_{info}=N_{RE}*Qm*v$ where R, Qm, and v are a coding rate, a modulation order, and the number of layers, respectively.

However, a plurality of TBs may be transmitted on each PDSCH (or PUSCH).

As described above, a full TTI refers to a TTI with all symbols carrying data, and a partial TTI refers to a TTI with some (consecutive) symbol(s) carrying data at the beginning (or end) thereof.

However, an RE may refer to transmission resources corresponding to a {OFDM symbol, subcarrier} combination in an OFDM transmission scheme.

However, the TBS determination method may be applied only to initially transmitted TBs (i.e., not applied to retransmission TBs).

The above-described options 2-1 to 2-3 are summarized as follows.

In the NR system according to the embodiment of the present disclosure, the number of REs available for PDSCH (or PUSCH) transmission may be calculated, and a TBS to be transmitted on a PDSCH (or PUSCH) may be calculated by reflecting a coding rate, a modulation order, and the number of layers in the number of REs. Even when multi-TTI scheduling is introduced to the NR U-band, the UE may calculate the TBS of each PDSCH (or PUSCH) transmitted in each of a plurality of TTIs based on the number of REs available for the PDSCH (or PUSCH) in a similar manner to the above method (option 2-1). In this case, the BS may indicate a coding rate and a modulation order to be commonly applied to the plurality of TTIs by an MCS field. However, more characteristically in the NR-U band, it may occur that some (OFDM) symbols of PDSCH (or PUSCH) transmission resources scheduled by an LBT operation are punctured/rate-matched. In this case, it is necessary to consider how to reflect the symbols in calculating a TBS. The number of available REs and a TBS may always be calculated simply based on the number of symbols in (scheduled) PDSCH (or PUSCH) transmission resources. Alternatively, if some (OFDM) symbols of PDSCH (or PUSCH) resources are punctured, the punctured symbols may still be counted as the number of symbols in the TBS calculation formula, expecting that there will be no change in a TBS because TBs are not newly configured. On the contrary, if some (OFDM) symbols of PDSCH (or PUSCH) resources are rate-matched, the rate-matched symbols may be excluded from the number of symbols in the TBS calculation formula, because TBs may be newly configured.

In another method, when TTI types are divided into partial TTI or full TTI in a multi-TTI transmission, a (single) TBS may be calculated on the assumption of one of the partial TTI or the full TTI, and the calculated (single) TBS may be applied commonly to the plurality of TTIs (option. 2-2). Alternatively, when the BS indicates PDSCH (or PUSCH) scheduling in a certain time unit by an SLIV scheme or the like, PDSCH(s) (or PUSCH(s)) may be transmitted in repetitions of the time unit regardless of TTI boundaries, and a TBS may be determined based on the number of available REs in the time unit (option 2-3).

Proposed method #2 may be applied in combination with other proposed methods of the present disclosure, unless contradicting each other.

[Proposed Method #3] Method of Determining a Data Mapping Type

Conventionally, time resources are allocated in the structure of 1 slot-1 SLIV-1 data mapping type. However, when a plurality of TTIs are scheduled for the UE in consideration of an LBT operation in the NR U-band according to an embodiment of the present disclosure, how to schedule a data mapping type for the TTIs needs to be discussed.

When the BS indicates data scheduling in a plurality of TTIs or slots to the UE, and when the BS indicates a data mapping type for a PDSCH (or PUSCH), data mapping types may be allocated to the plurality of TTIs or slots for data transmission and reception in one or more of the following methods.

(1) Opt. 3-1: The plurality of TTIs are divided into two groups A and B. A data mapping type for one of the two groups is indicated by DCI, and a data mapping type for the other group is predetermined or configured by a higher-layer signal.
  A. Opt. 3-1-1: Group A=partial TTI(s), Group B=full TTI(s)
  B. Opt. 3-1-2: Group A=first/Last TTI, group B=middle TTI(s)
  C. Opt. 3-1-3: Group A=first TTI, group B=other TTI(s)

(2) Opt. 3-2: The TTIs are divided into two groups A and B, candidates for a data mapping type combination for the two groups are configured by a higher layer, and one of the candidates is indicated by DCI.
  A. Opt. 3-2-1: Group A=partial TTI(s), Group B=full TTI(s)
  B. Opt. 3-2-2: Group A=first/Last TTI, group B=middle TTI(s)
  C. Opt. 3-2-3: Group A=first TTI, group B=other TTI(s)

When N multiple TTIs or N multiple slots are configured, a method of indicating a data mapping type for one TTI or one slot repeatedly N times may be considered, but with great scheduling overhead. Therefore, in option 3-1 and option 3-2, the multiple TTIs or slots may be grouped, the same data mapping type may be applied to the TTIs of the same group, and the data mapping type may be indicated once for each group, thereby increasing scheduling efficiency. The number of scheduled TTIs is larger than the number of groups.

(3) Opt. 3-3: Candidates for a data mapping type combination for a plurality of TTIs are configured by a higher layer, and one of the candidates is indicated by DCI.

As described above, a TTI with all symbols continuously allocated for data transmission may be referred to as a full TTI, and a TTI with some symbols allocated for data transmission may be referred to as a partial TTI.

That is, a TTI with all symbol(s) carrying data, such as the TTIs F, G and H, may be a full TTI, and a TTI with some (consecutive) symbol(s) carrying data at the beginning (or end), such as the TTIs E and I, may be a partial TTI.

The TTIs E and I may be the first TTI and the last TTI, respectively. The first and the last ones of the plurality of consecutive TTIs may be full TTIs, not necessarily partial TTIs. A middle TTI refers to a TTI other than the first TTI and the last TTI.

Considering unlicensed-band LBT in the NR U-band according to an embodiment of the present disclosure, transmitting data in available contiguous time resources may be favorable in terms of channel occupancy during multi-TTI scheduling. Most of a plurality of TTIs may be full TTIs each with all symbols carrying data, whereas only the first and last ones of the TTIs may be partial TTIs each with some consecutive symbol(s) carrying data at the beginning (or end).

Therefore, when continuous data transmission over a plurality of TTIs is assumed, a middle TTI may be a full TTI. The first TTI and the last TTI may be full TTIs or partial TTIs.

A data mapping type may mean a DMRS transmission symbol position within a TTI, when a PDSCH (or PUSCH) is transmitted. For example, the following data mapping types may be considered.
  Data mapping type A: DMRS transmission in the $3^{rd}$ or $4^{th}$ symbol in a TTI
  Data mapping type B: DMRS transmission in the first symbol of a PDSCH (or PUSCH) transmission period In the LTE system, for example, there is no defined data mapping type for the PDSCH or the PUSCH, and the DMRS is located at a fixed symbol position. Compared to the LTE system, there are two data mapping types, type A and type B in the NR system.

Data mapping type A may mean a type in which the DMRS is transmitted in a fixed symbol within a TTI or slot. Data mapping type B may mean a type in which the DMRS is transmitted in the first symbol of a PDSCH or PUSCH transmission period.

That is, when the PDSCH (or PUSCH) is transmitted, data mapping type information that defines a relative transmission position of the DMRS may be indicated to the UE in the NR system. For example, data mapping type A in which the DMRS is transmitted in the third or fourth symbol of a slot (or TTI) and data mapping type B in which the DMRS is transmitted in the first symbol of a PDSCH (or PUSCH) transmission period may be supported.

In the NR system, a data mapping type may be indicated together with an SLIV by DCI, when the BS allocates time resources for the PDSCH or the PUSCH to the UE.

Specifically, a time resource allocation for the PDSCH may be indicated as {k0, data mapping type, SLIV} by DCI, and a time resource allocation for the PUSCH may be indicated as {k2, data mapping type, SLIV} by DCI. Referring to FIG. 12, k0 is an offset (the number of TTIs or slots) related to a time until the UE receives the PDSCH after receiving a PDCCH including DL allocation information, and k2 is an offset related to a time until the UE transmits the PUSCH after receiving a PDCCH including a UL grant. The SLIV indicates a starting symbol and a data transmission length for resource allocation in the time domain, as described before.

For example, upon receipt of DCI, the UE may receive a PDSCH based on a data mapping type during a time period indicated by an SLIV, starting from a starting symbol indicated by the SLIV in a slot spaced from a slot in which the DCI has been received by k0.

For example, upon receipt of DCI, the UE may transmit a PUSCH based on a data mapping type during a time period indicated by an SLIV, starting from a starting symbol indicated by the SLIV in a slot spaced from a slot in which the DCI has been received by k2.

The above examples are for one TTI. Since the embodiment of the present disclosure is based on multi-TTI scheduling, it is necessary to consider how to configure a data mapping type for each TTI in the case of multi-TTI scheduling. The above options propose how to signal a data mapping type, when a plurality of TTIs or a plurality of slots are configured for transmission/reception of a PDSCH or a PUSCH.

The legacy 1 slot-1 SLIV-1 data mapping type time resource allocation method may be extended to a plurality of TTIs or a plurality of slots, such that without indicating a data mapping type for one TTI or one slot repeatedly N times, the multiple TTIs or slots may be grouped, and the same data mapping type may be applied to the TTIs of the same group. The number of scheduled TTIs is larger than the number of groups.

In one method, TTIs may be divided into a partial TTI group and a full TTI group according to data transmission schemes within the TTIs. A data mapping type for one of the two groups may be indicated by DCI, while a data mapping type for the other group may be predefined or configured by a higher-layer signal. For example, data mapping type A may be pre-agreed or configured by a higher-layer signal, for the full TTIs, and data mapping type A or B may be dynamically indicated for the partial TTIs by DCI. On the contrary, data mapping type B may be pre-agreed for application to the partial TTIs, and data mapping type A or B may be dynamically indicated for the full TTIs by DCI (option 3-1).

Figure 13:
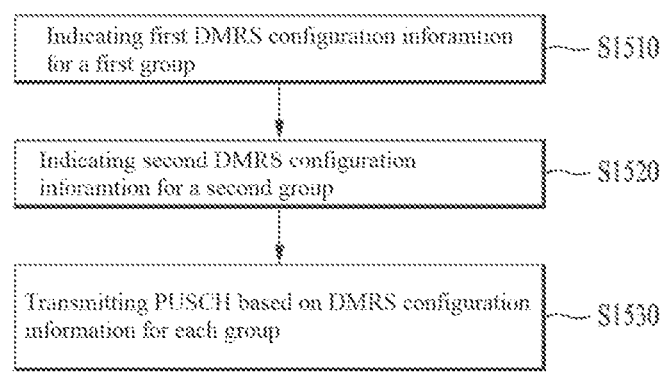

For example, option 3-1-1 will be described below with reference to FIGS. 11, 13 and 14. In option 3-1-1, group A may include the partial TTIs E and I illustrated in FIG. 11, and group B may include full TTIs F, G and H illustrated in FIG. 11.

Let group A and group B be referred to as a first group and a second group, respectively. Then, DMRS configuration information for the first group may be indicated in a first method, and DMRS configuration information for the second group may be indicated in a second method (S1510 to S1520). The first method and the second method may be the same or different. Herein, DMRS configuration information may be a data mapping type in proposed method #3. Data mapping types may be classified into data mapping type A and data mapping type B according to the position of the first DMRS symbol in a TTI.

The DMRS configuration information configured for each group is applied commonly to the TTIs of the group. That is, when data mapping type A is configured for the first group and data mapping type B is configured for the second group, the BS may transmit a PDSCH based on data mapping type A in the TTIs E and I of the first group, and transmit the PDSCH based on data mapping type B in the TTIs F, G and H of the second group (S1530). In another example, the UE may transmit a PUSCH based on data mapping type A in the TTIs E and I of the first group, and transmit the PUSCH based on data mapping type B in the TTIs F, G, and H of the second group.

More specifically, referring to FIG. 14(a), grouping may be performed by the BS (S1610) or skipped. Let group A and group B be referred to as a first group and a second group, respectively. Then, the BS may indicate a data mapping type for the first group to the UE in a first method, for example, by DCI (S1620). The BS may indicate a data mapping type for the second group to the UE in a second method, for example, by a higher-layer signal (S1630). The first method and the second method may be the same or different.

The data mapping type configured for each group is applied commonly to the TTIs of the group. That is, when data mapping type A is configured for the first group and data mapping type B is configured for the second group, the BS may transmit a PDSCH based on data mapping type A in the TTIs E and I of the first group, and transmit the PDSCH based on data mapping type B in the TTIs F, G and H of the second group (S1640).

From the viewpoint of PUSCH transmission from the UE, S1650 to S1670 of FIG. 14(b) may correspond to S1610 to S1630 of FIG. 14(a). The UE may transmit a PUSCH based on the data mapping type configured for each group (S1680). For example, the UES may transmit the PUSCH based on data mapping type A in the TTIs E and I of the first group, and transmit the PUSCH based on data mapping type B in the TTIs F, G and H of the second group.

Alternatively, the BS may configure a candidate group of data mapping type combinations for partial TTIs and full TTIs (or a candidate group of data mapping type combinations for multiple TTIs) by a higher-layer signal or the like and then indicate one candidate of the candidate group to the UE by DCI (option 3-2 or 3-3).

Figure 16:
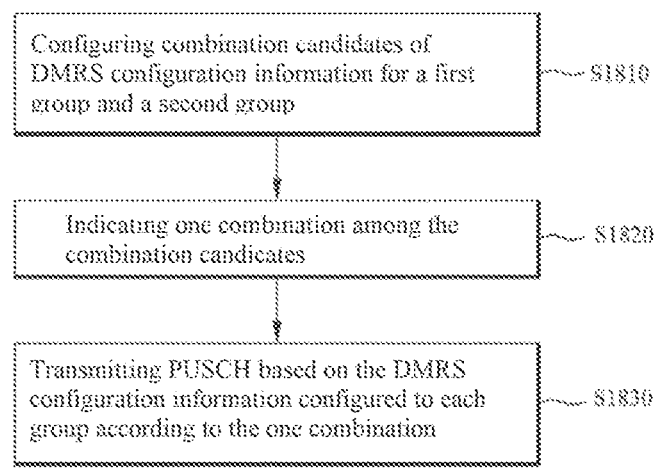

For example, according to option 3-2, a plurality of TTIs may be grouped into two groups in the same manner as in option 3-1. Specifically, referring to FIG. 16, candidates of a DMRS configuration information combination for the groups may be configured by a higher-layer signal (S1810). According to proposed method #3, DMRS configuration information may be a data mapping type. Therefore, combinations of data mapping type candidates (e.g., {A, A}, {A, B}, {B, A}, {B, B}) may be configured by a higher-layer signal. Then, the BS may indicate one (e.g., {A, B}) of the candidates to the UE by DCI (S1820). The UE may transmit a PUSCH based on the combination (S1830). That is, the UE may transmit the PUSCH by applying data mapping type A to the TTIs of the first group and applying data mapping type B to the TTIs of the second group. Alternatively, the BS may transmit the PDSCH by applying data mapping type A to the TTIs of the first group and applying data mapping type B to the TTIs of the second group.

For example, according to option 3-3, the BS may configure candidates for a data mapping type combination for a plurality of TTIs by a higher-layer signal, and indicate one of the candidates by DCI, without dividing the TTIs into groups.

Proposed method #3 may be applied in combination with other proposed methods of the present disclosure, unless contradicting each other.

[Proposed Method #4] Method of Determining DMRS Transmission Information

Compared to proposed method #3 which relates to a symbol position for DMRS transmission in a TTI or slot during PDSCH (or PUSCH) transmission, proposed method #4 as described below is an embodiment of a method of indicating specific information related to DMRS information, for example, information about the number of antenna ports or the number of symbols by a BS.

When the BS indicates data scheduling in a plurality of TTIs or slots to the UE, and when the BS indicates information related to DMRS transmission on a PDSCH (or PUSCH), information about DMRS transmission in the plurality of TTIs or slots for the data transmission may be allocated (on a TTI basis) in one or more of the following methods.

(1) Opt. 4-1: (A single piece of) DMRS transmission information is indicated by DCI and applied commonly to the plurality of slots.

(2) Opt. 4-2: The TTIs are divided into two groups A and B. DMRS transmission information for one of the two groups is indicated by DCI, and DMRS transmission information for the other group is configured in a pre-agreed method or by a higher-layer signal.

A. Opt. 4-2-1: Group A=partial TTI(s), Group B=full TTI(s)
 B. Opt. 4-2-2: Group A=first/Last TTI, group B=middle TTI(s)
 C. Opt. 4-2-3: Group A=first TTI, group B=other TTI(s)

(3) Opt. 4-3: The TTIs are into two groups A and B, candidates for a DMRS transmission information combination for the two groups are configured by a higher-layer signal, and one of the candidates is indicated by DCI.

A. Opt. 4-3-1: Group A=partial TTI(s), Group B=full TTI(s)
 B. Opt. 4-3-2: Group A=first/last TTI, group B=middle TTI(s)
 C. Opt. 4-3-3: Group A=first TTI, group B=other TTI(s)

(4) Opt. 4-4: Candidates for a DMRS transmission information combination for the plurality of TTIs are configured by a higher layer, and one of the candidates is indicated by DCI.

The DMRS transmission information may include configuration information related to DMRS transmission and reception, such as the number of groups that the BS is currently using among DMRS resource groups placed in a code division multiplexing (CDM) relationship, the number of DMRS antenna ports, the number of (front loaded) DMRS symbols, and information indicating whether the DMRS is configured in units of one symbol or two consecutive symbols.

As described above, a TTI with all symbol(s) carrying data is a full TTI (e.g., the TTIs F, G and H in FIG. 11), and a TTI with some (consecutive) symbol(s) carrying data at the beginning (or end) is a partial TTI (e.g., the TTIs E and I in FIG. 11). A middle TTI is a TTI other than the first and last TTIs.

Considering unlicensed-band LBT in the NR U-band according to an embodiment of the present disclosure, transmitting data in available contiguous time resources may be favorable in terms of channel occupancy during multi-TTI scheduling. Most of a plurality of TTIs may be full TTIs each with all symbols carrying data, whereas only the first and last ones of the TTIs may be partial TTIs each with some consecutive symbol(s) carrying data at the beginning (or end). In the NR system, DMRS transmission information may be indicated to the UE, including information about the number of groups currently in use among DMRS resource groups placed in a CDM relationship (data transmission in the corresponding resource groups is not expected), the number of DMRS antenna ports, the number of (front loaded) DMRS symbols, and information indicating whether the DMRS is configured in units of one symbol or two consecutive symbols, during PDSCH (or PUSCH) transmission. Herein, how to configure the DMRS transmission information for each TTI during multi-TTI scheduling needs to be considered.

In one method, the BS may indicate one piece of DMRS transmission information by DCI such that the DMRS transmission information is applied commonly to all of the plurality of TTIs (option 4-1).

In another method, for a partial TTI group and a full TTI group into which TTIs are classified according to the data transmission types of the TTIs, DMRS transmission information for one of the two groups may be indicated by DCI, and DMRS transmission information for the other group may be configured in a pre-agreed method or by a higher-layer signal (option 4-2).

For example, option 4-2-2 will be described below with reference to FIGS. 11, 13 and 15. In option 4-2-2, group A may include the first and last TTIs E and I of FIG. 11, and group B may include the middle TTIs F, G and H of FIG. 11.

Let group A and group B be referred to as a first group and a second group, respectively. Then, DMRS configuration information for the first group may be indicated in a first method, for example, by DCI, and DMRS configuration information for the second group may be indicated in a second method, for example, by a higher-layer signal (S1510 to S1520). The first method and the second method may be the same or different. The DMRS configuration information may be information related to DMRS transmission—such as the number of DMRS antenna ports, the number of DMRS symbols, and so on according to proposed method #4.

The DMRS configuration information configured for each group is equally applied to the TTIs of the group. The DMRS configuration information configured for the first group is equally applied to the TTIs E and I. Similarly, the DMRS configuration information configured for the second group is equally applied to the TTIs F, G and H. The BS may transmit a PDSCH based on the DMRS configuration information for each group to the UE (S1530).

Figure 15:
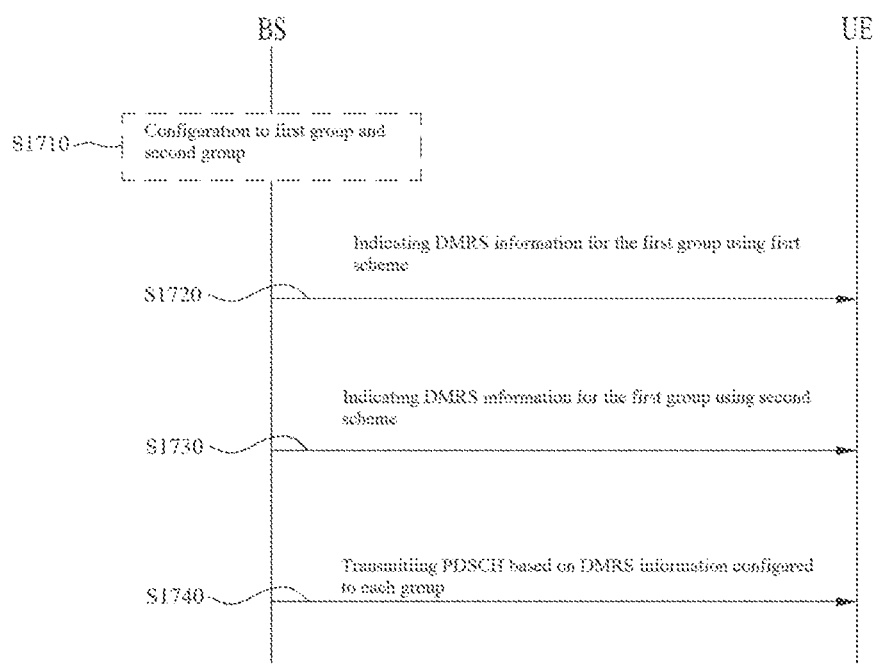

More specifically, referring to FIG. 15, grouping may be performed by the BS (S1710) or skipped.

Let group A and group B be referred to as a first group and a second group, respectively. Then, the BS may indicate DMRS information for the first group in a first method, for example, by DCI, and indicate DMRS information for the second group in a second method, for example, by a higher-layer signal (S1720 to S1730). The first method and the second method may be the same or different.

The DMRS information configured for each group is applied commonly to the TTIs of the group. The DMRS information configured for the first group is equally applied to the TTIs E and I. Similarly, the DMRS information configured for the second group is equally applied to the TTIs F, G and H. The UE may receive a PDSCH on the common DMRS information for each group (S1740). Alternatively, the UE may transmit a PUSCH on the common DMRS information for each group.

Alternatively, the BS may configure a candidate group of DMRS transmission information combinations for partial TTIs and full TTIs (or a candidate group of DMRS transmission information combinations for multiple TTIs) by a higher-layer signal or the like and then indicate one candidate of the candidate group by DCI (option 4-3 or 4-4).

For example, according to option 4-3, a plurality of TTIs may be grouped into two groups in the same manner as in option 4-2. The BS may configure DMRS transmission information combinations for the groups by a higher-layer signal and then indicate one of the combinations to the UE by DCI. For example, the BS may indicate a combination of {DMRS information for the first group, DMRS information for the second group} by DCI. The BS may transmit a PDSCH based on DMRS information for each group according to the combination.

For example, according to option 4-4, the BS may configure candidates for a data mapping type combination for a plurality of TTIs by a higher-layer signal, and indicate one of the candidates by DCI, without dividing the TTIs into groups.

Proposed method #4 may be applied in combination with other proposed methods of the present disclosure, unless contradicting each other.

The UE may perform a network access process to perform the above-described/proposed procedures and/or methods (FIGS. 13 to 16). For example, the UE may receive and store system information and configuration information required to perform the above-described/proposed procedures and/or methods (FIGS. 13 to 16) during network access (e.g., BS access). The configuration information required for the present disclosure may be received by higher-layer signaling (e.g., RRC signaling or MAC-layer signaling).

Figure 17:
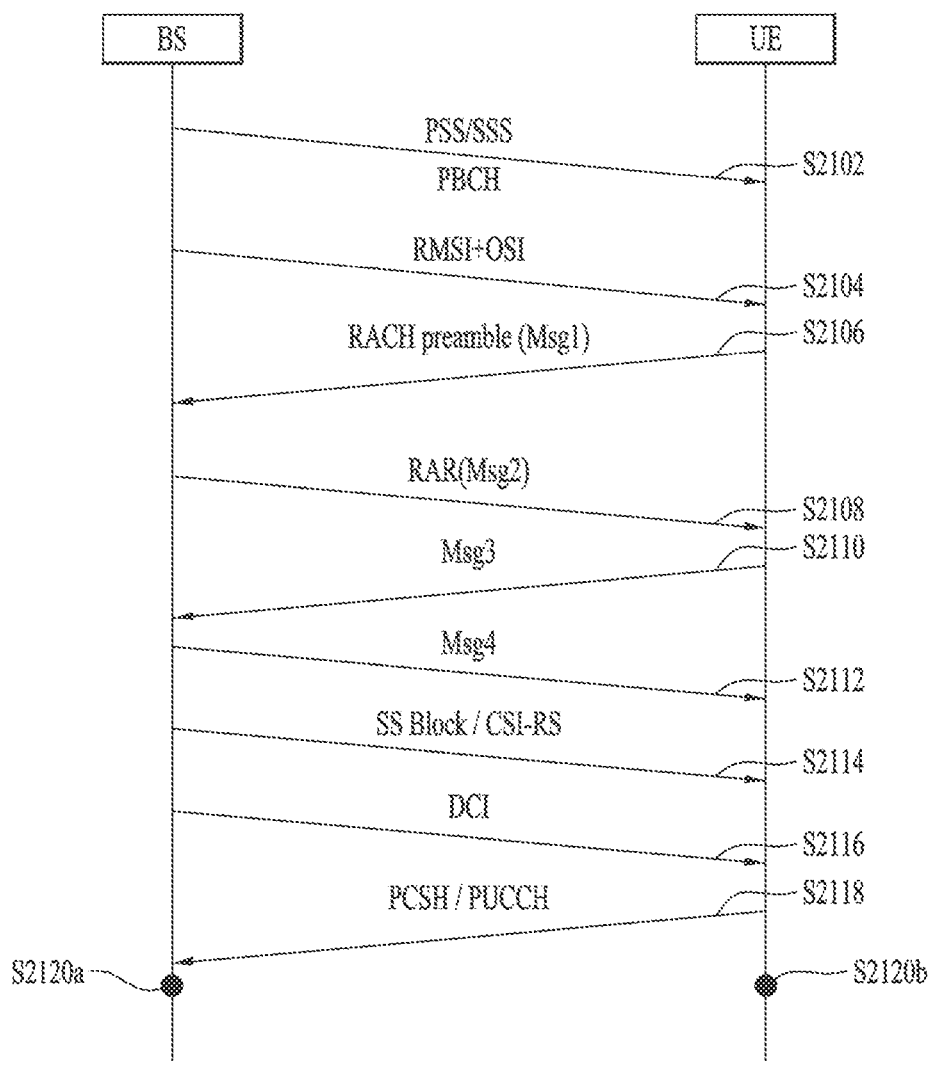
FIG. 17 is a diagram illustrating a signal flow for a network initial access and subsequent communication process.

FIG. 17 is a diagram illustrating an initial network access and subsequent communication process. In NR, a physical channel and an RS may be transmitted by beamforming. When beamforming-based signal transmission is supported, beam management may follow, for beam alignment between a BS and a UE. Further, a signal proposed by the present disclosure may be transmitted/received by beamforming. In RRC IDLE mode, beam alignment may be performed based on an SSB, whereas in RRC CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 17, a BS (e.g., eNB) may periodically transmit an SSB may be transmitted by beam sweeping (see FIG. D5). The BS may then transmit remaining minimum system information (RMSI) and other system information (OSI) (S2104). The RMSI may include information required for initial access to the BS (e.g., PRACH configuration information). After detecting SSBs, the UE identifies the best SSB. The UE may them transmit an RACH preamble (Message 1; Msg1) in PRACH resources linked/corresponding to the index (i.e., beam) of the best SSB (S2106). The beam direction of the RACH preamble is associated with the PRACH resources. Association between PRSCH resources (and/or RACH preambles) and SSBs (SSB indexes) may be configured by system information (e.g., RMSI). Subsequently, in an RACH procedure, the BS may transmit a random access response (Msg2) in response to the RACH preamble (S2108), the UE may transmit Msg3 (e.g., RRC Connection Request) based on a UL grant included in the RAR (S2110), and the BS may transmit a contention resolution message (Msg4) (S2112). Msg4 may include RRC Connection Setup. Msg1 and Msg3 transmissions may be performed together in one step (e.g., MsgA transmission), and Msg2 and Msg4 transmissions may be performed together in one step (e.g., MsgB transmission).

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S2114). The SSB/CSI-RS may be used for the UE to generate a beam/CSI report. The BS may request the UE to transmit a beam/CSI report, by DCI (S2116). In this case, the UE may generate a beam/CSI report based on the SSB/CSI-RS and transmit the generated beam/CSI report to the BS on a PUSCH/PUCCH (S2118). The beam/CSI report may include a beam measurement result, information about a preferred beam, and so on. The BS and the UE may switch beams based on the beam/CSI report (S2120a and S2120b).

Subsequently, the UE and the BS may perform the above-described/proposed procedures and/or methods (FIGS. 13 to 16). For example, the UE and the BS may transmit a wireless signal by processing information stored in a memory or may process a received wireless signal and store the processed signal in a memory according to the proposal of the present disclosure, based on configuration information obtained in a network access process (e.g., a system information acquisition processor, an RRC connection process on an RACH, and so on). The wireless signal may include at least one of a PDCCH, a PDSCH, or an RS on DL and at least one of a PUCCH, a PUSCH, or an SRS on UL.

The above-described various embodiments of the present disclosure may be combined with the foregoing initial network access process to construct other various embodiments of the present disclosure, which will be clearly understood to those skilled in the art.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
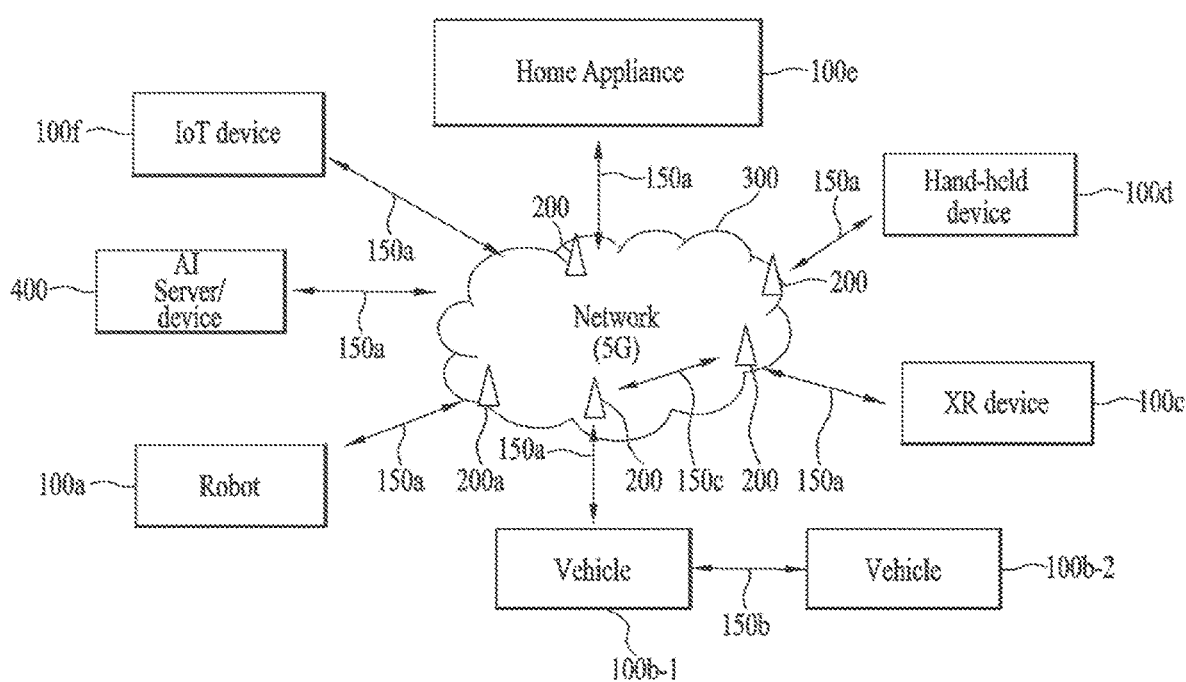
FIG. 18 is a diagram illustrating an exemplary communication system applied to the present disclosure.

FIG. 18 illustrates a communication system 1 applied to the present disclosure

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
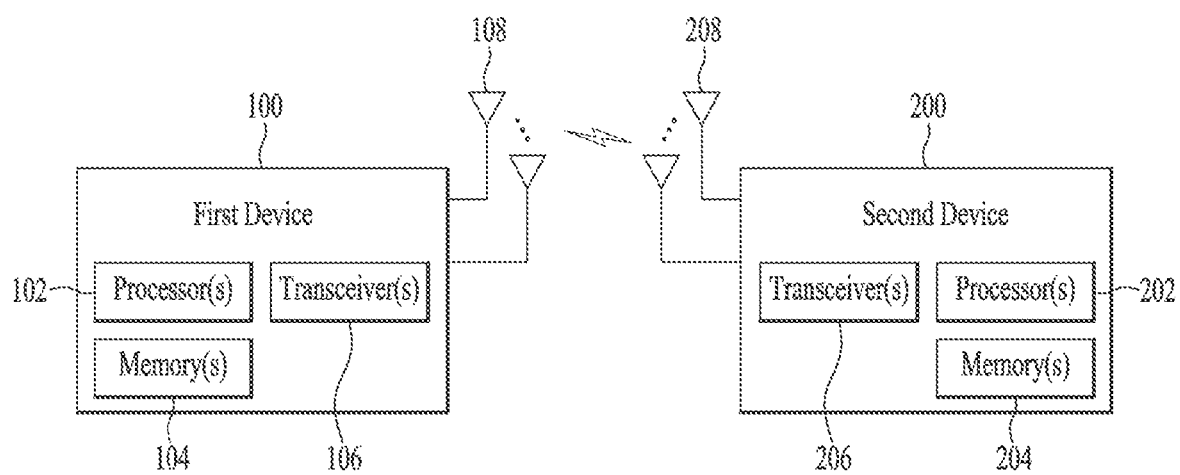
FIG. 19 is a diagram illustrating an exemplary wireless device applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

For example, the processor 102 or 202 of the wireless device 100 or 200 according to the present disclosure may receive DMRS configuration information, receive scheduling information for a plurality of TTIs, and transmit or receive data based on the DMRS configuration information in a plurality of consecutive TTIs.

Figure 20:
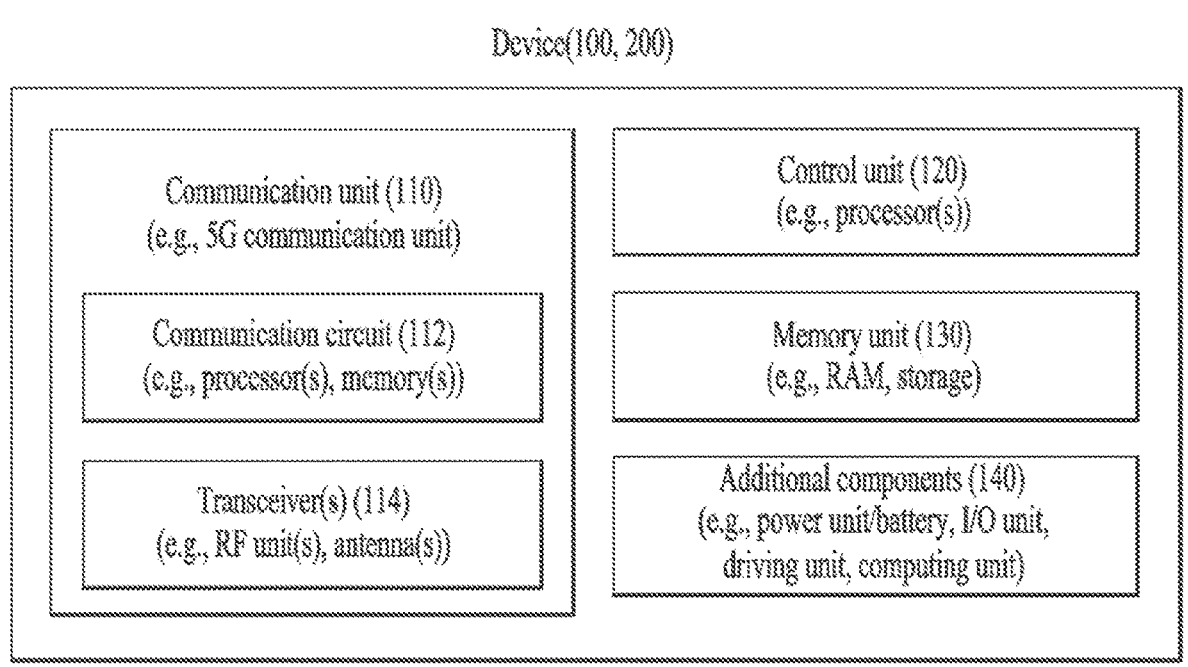
FIG. 20 is a diagram illustrating another exemplary wireless device applicable to the present disclosure.

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
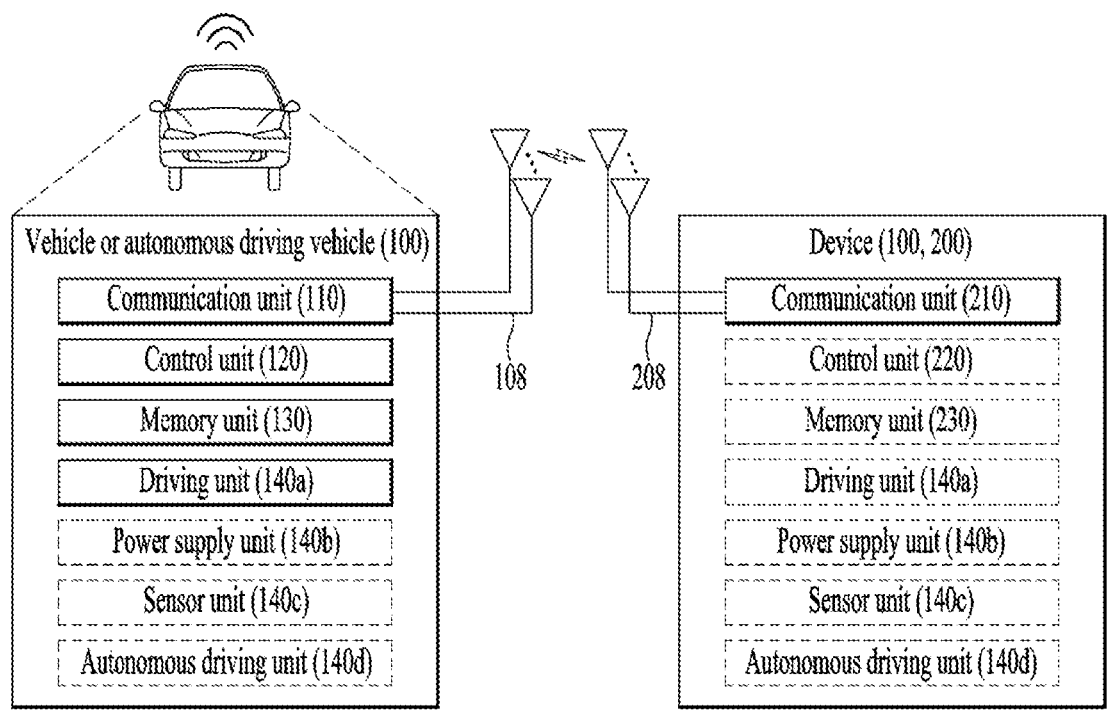
FIG. 21 is a diagram illustrating an exemplary vehicle or autonomous driving vehicle applicable to the present disclosure.

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to a UE, a BS, or other equipment in a wireless mobile communication system.

What is claimed is:
1. A method for transmitting a Physical Uplink Shared Channel (PUSCH) by a user equipment (UE) in a wireless communication system, the method comprising:

receiving Downlink Control Information (DCI) for scheduling a plurality of Physical Uplink Shared Channels (PUSCHs);

obtaining, from the DCI, (i) a respective starting symbol index for each of the plurality of PUSCHs, among a plurality of starting symbol indices and (ii) information of a respective length for each of the plurality of PUSCHs, among a plurality of lengths; and transmitting the each of the plurality of PUSCHs based on (i) the respective starting symbol index among the plurality of starting symbol indices indexes and (ii) the respective length among the plurality of lengths, wherein a number of the plurality of PUSCHs is determined based on a number of combinations of starting symbol indices and lengths indicted by the DCI.

2. The method of claim 1, wherein information related to (i) candidate starting symbol indices that can be configured to the plurality of starting symbol indices and (ii) candidate lengths that can be configured to the plurality of lengths are received via a higher layer signaling.

3. The method of claim 1, wherein a first PUSCH scheduled in a first slot is allocated from a symbol having a first start symbol index among the plurality of starting symbol indices to consecutive symbols as many as a first length among the plurality of lengths, wherein a second PUSCH scheduled in a second slot is allocated from a symbol having a second start symbol index among the plurality of starting symbol indices to consecutive symbols as many as a second length among the plurality of lengths, and wherein the first PUSCH and the second PUSCH are included in the plurality of PUSCHs.

4. The method of claim 1, wherein the plurality of PUSCHs are scheduled to consecutive slots.

5. The method of claim 1, wherein the number of the plurality of PUSCHs and the number of combinations of starting symbol indices and lengths indicated by the DCI are identical.

6. A user equipment (UE) configured to transmit a Physical Uplink Shared Channel (PUSCH) in a wireless communication system, the UE comprising:

at least one transceiver;
at least one processor; and
at least one computer memory operably connectable to the at least one processor and storing instructions that, when executed by the at least one processor, perform operations comprising:

receiving, via the at least one transceiver, Downlink Control Information (DCI) for scheduling a plurality of Physical Uplink Shared Channels (PUSCHs);

obtaining, from the DCI, (i) a respective starting symbol index for each of the plurality of PUSCHs, among a plurality of starting symbol indices and (ii) information of a respective length for each of the plurality of PUSCHs, among a plurality of lengths; and transmitting, via the at least one transceiver, the each of the plurality of PUSCHs based on (i) the respective starting symbol index among the plurality of starting symbol indices and (ii) the respective length among the plurality of lengths, wherein a number of the plurality of PUSCHs is determined based on a number of combinations of starting symbol indices and lengths indicated by the DCI.

7. The UE of claim 6, wherein information related to (i) candidate starting symbol indices that can be configured to the plurality of starting symbol indices and (ii) candidate lengths that can be configured to the plurality of lengths are received via a higher layer signaling.

8. The UE of claim 6, wherein a first PUSCH scheduled in a first slot is allocated from a symbol having a first start symbol index among the plurality of starting symbol indices to consecutive symbols as many as a first length among the plurality of lengths, wherein a second PUSCH scheduled in a second slot is allocated from a symbol having a second start symbol index among the plurality of starting symbol indices to consecutive symbols as many as a second length among the plurality of lengths, and wherein the first PUSCH and the second PUSCH are included in the plurality of PUSCHs.

9. The UE of claim 6, wherein the plurality of PUSCHs are scheduled to consecutive slots.

10. The UE of claim 6, wherein the number of the plurality of PUSCHs and the number of combinations of starting symbol indices and lengths indicated by the DCI are identical.

11. An apparatus configured to transmit a Physical Uplink Shared Channel (PUSCH) in a wireless communication system, the apparatus comprising:

at least one processor; and
at least one computer memory operably connectable to the at least one processor and storing instructions that, when executed by the at least one processor, perform operations comprising:

receiving Downlink Control Information (DCI) for scheduling a plurality of Physical Uplink Shared Channels (PUSCHs);

obtaining, from the DCI, (i) a respective starting symbol index for each of the plurality of PUSCHs, among a plurality of starting symbol indices and (ii) information of a respective length for each of the plurality of PUSCHs, among a plurality of lengths; and transmitting the each of the plurality of PUSCHs based on (i) each of the respective starting symbol index among the plurality of starting symbol indices and (ii) the respective length among the plurality of lengths, wherein a number of the plurality of PUSCHs is determined based on a number of combinations of starting symbol indices and lengths indicated by the DCI.

* * * * *